(12) United States Patent
Morinaga

(10) Patent No.: US 11,067,863 B2
(45) Date of Patent: Jul. 20, 2021

(54) LIQUID CRYSTAL PANEL AND LIQUID CRYSTAL DISPLAY DEVICE

(71) Applicant: SHARP KABUSHIKI KAISHA, Sakai (JP)

(72) Inventor: Junichi Morinaga, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/627,183

(22) PCT Filed: Jul. 9, 2018

(86) PCT No.: PCT/JP2018/025833
§ 371 (c)(1),
(2) Date: Dec. 27, 2019

(87) PCT Pub. No.: WO2019/013152
PCT Pub. Date: Jan. 17, 2019

(65) Prior Publication Data
US 2020/0124929 A1    Apr. 23, 2020

(30) Foreign Application Priority Data
Jul. 14, 2017    (JP) .............................. JP2017-138370

(51) Int. Cl.
*G02F 1/1362* (2006.01)
*G02F 1/1343* (2006.01)
*G02F 1/1368* (2006.01)

(52) U.S. Cl.
CPC .. *G02F 1/136259* (2013.01); *G02F 1/134309* (2013.01); *G02F 1/136209* (2013.01); *G02F 1/136227* (2013.01); *G02F 1/136286* (2013.01); *G02F 1/1368* (2013.01); *G02F 1/13629* (2021.01); *G02F 1/134318* (2021.01); *G02F 1/136263* (2021.01); *G02F 1/136295* (2021.01); *G02F 2201/123* (2013.01)

(58) Field of Classification Search
CPC ......... G02F 1/136286; G02F 1/136213; G02F 1/13629
See application file for complete search history.

(56) References Cited

U.S. PATENT DOCUMENTS

| | | | | |
|---|---|---|---|---|
| 8,330,924 B2 * | 12/2012 | Yee | ................... | G02F 1/136286 349/147 |
| 2003/0142260 A1 * | 7/2003 | Asai | ................. | G02F 1/134363 349/141 |
| 2015/0364102 A1 * | 12/2015 | Oh | .................... | G02F 1/136286 345/206 |

FOREIGN PATENT DOCUMENTS

JP    H11-242243 A    9/1999

* cited by examiner

*Primary Examiner* — Jessica M Merlin
(74) *Attorney, Agent, or Firm* — ScienBiziP, P.C.

(57) ABSTRACT

A liquid crystal panel includes a first substrate and a second substrate. The first substrate includes a plurality of first wires, a second wire that intersects with the plurality of first wires, and a third wire that is arranged in a layer different from a layer in which the second wire is arranged and that is arranged in parallel to the second wire. An aperture is formed in at least any of all intersection portions in which the plurality of first wires and the second wire intersect. The second wire and the third wire are connected through a contact hole that is formed in the aperture.

9 Claims, 26 Drawing Sheets

29  30

LIQUID CRYSTAL PANEL AND LIQUID CRYSTAL DISPLAY DEVICE

TECHNICAL FIELD

The present invention relates to a liquid crystal panel and a liquid crystal display device.

BACKGROUND ART

In a case where a line defect such as disconnection or inter-wire leakage occurs when a liquid crystal panel is produced, a yield of the liquid crystal panel is decreased. When such a line defect occurs even at one place in the liquid crystal panel, it is determined that the liquid crystal panel is a defective product. Since a high resolution panel or a large panel has a large number of wires, it is particularly difficult to raise a yield thereof.

A line defect is caused mainly because of design. A source line (data line) is designed as a thin line in many cases in order to secure an aperture ratio of a pixel or take measures against occurrence of crosstalk. Accordingly, a possibility that disconnection of the source line occurs at a time of manufacturing a liquid crystal panel increases. Furthermore, an inter-layer insulating film that is arranged between the source line and a gate line is designed as a thin film in many cases in order to achieve constant TFT characteristics. Thus, insulation short-circuit between layers which is represented by, for example, short-circuit between a source line and a gate line is easily caused. Such disconnection or short-circuit prevents a liquid crystal panel from having good quality.

PTL 1 discloses a liquid crystal display device that has a configuration in which data lines and a redundant data line that is formed on an upper layer of the data lines with an insulating film interposed therebetween are included and the data lines and the redundant data line are connected via a contact hole.

CITATION LIST

Patent Literature

PTL 1: Japanese Unexamined Patent Application Publication No. 11-242243 (published on Sep. 7, 1999)

SUMMARY OF INVENTION

Technical Problem

In the liquid crystal display device of PTL 1, the contact hole is formed near a pixel aperture, so that there is a concern about occurrence of a display defect. Further, there is also a concern about a problem, such as light leakage, which is caused when the contact hole deteriorates flatness of a pixel and therefore an alignment defect of liquid crystal is caused.

An aspect of the invention is made in order to solve the aforementioned problems, and an object thereof is to achieve a liquid crystal panel for which a decrease in a yield due to a line defect is suppressed and a high pixel aperture ratio is obtained.

Solution to Problem

In order to solve the aforementioned problems, a liquid crystal panel according to an aspect of the invention includes: a first substrate; and a second substrate, in which liquid crystal is held between the first substrate and the second substrate, the first substrate includes a plurality of first wires, a second wire that intersects with the plurality of first wires, and a third wire that is arranged in a layer different from a layer in which the second wire is arranged and that is arranged in parallel to the second wire, an aperture is formed in at least any of all intersection portions in which the plurality of first wires and the second wire intersect, and the second wire and the third wire are connected through a contact hole that is formed in the aperture.

Advantageous Effects of Invention

According to an aspect of the invention, an effect that a decrease in a yield due to a line defect is suppressed and a high pixel aperture ratio is obtained is exerted.

DESCRIPTION OF EMBODIMENTS

Embodiment 1

Embodiment 1 according to the invention will be described below with reference to FIGS. 1 to 4.
(Configuration of Liquid Crystal Panel 1)

Figure 1:
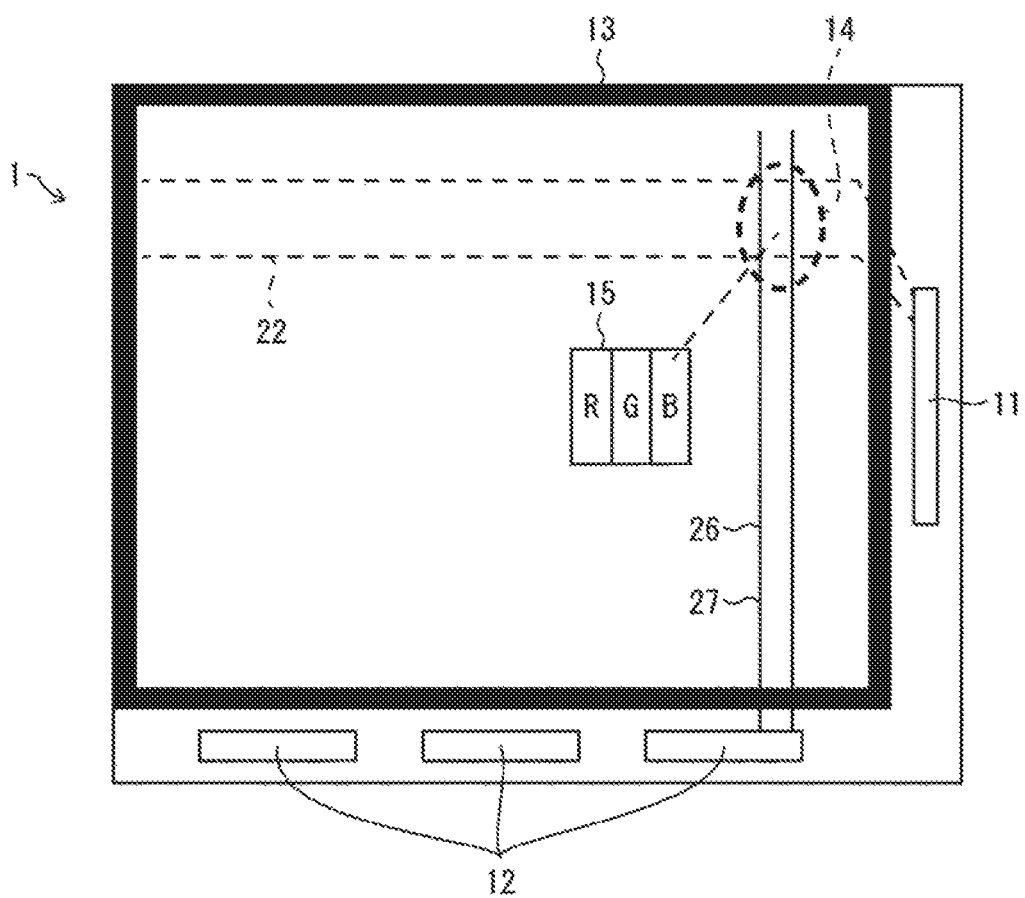
FIG. 1 is a block diagram illustrating a configuration of a main part of a liquid crystal panel according to Embodiment 1 of the invention.

FIG. 1 is a block diagram illustrating a configuration of a main part of a liquid crystal panel 1 according to Embodiment 1 of the invention. As illustrated in the figure, the liquid crystal panel 1 includes a gate driver 11, a source driver 12, a plurality of gate lines 22 (first wires), a plurality of lower-layer source lines 26 (second wires, first source lines), and a plurality of upper-layer source lines 29 (third wires, second source lines). The gate lines 22 are arranged in a display region 13 so as to extend in a horizontal direction, and the respective lower-layer source lines 26 and the respective upper-layer source lines 29 are arranged in the display region 13 so as to extend in a vertical direction orthogonal to the gate lines 22. The upper-layer source lines 29 are arranged in parallel to the lower-layer source lines 26. In each intersection region 14 in which a gate line 22 and a lower-layer source line 26 (upper-layer source line 29) intersect, a pixel 15 is formed. The pixel 15 is constituted by three sub-pixels composed of a red sub-pixel (R), a blue sub-pixel (B), and a green sub-pixel (G). Thereby, the liquid crystal panel 1 is able to perform color display. The gate driver 11 is connected to the gate lines 22, and outputs gate signals to the gate lines 22. The source driver 12 is connected to the lower-layer source lines 26, and outputs source signals (data signals) to the lower-layer source lines 26.

Figure 2:
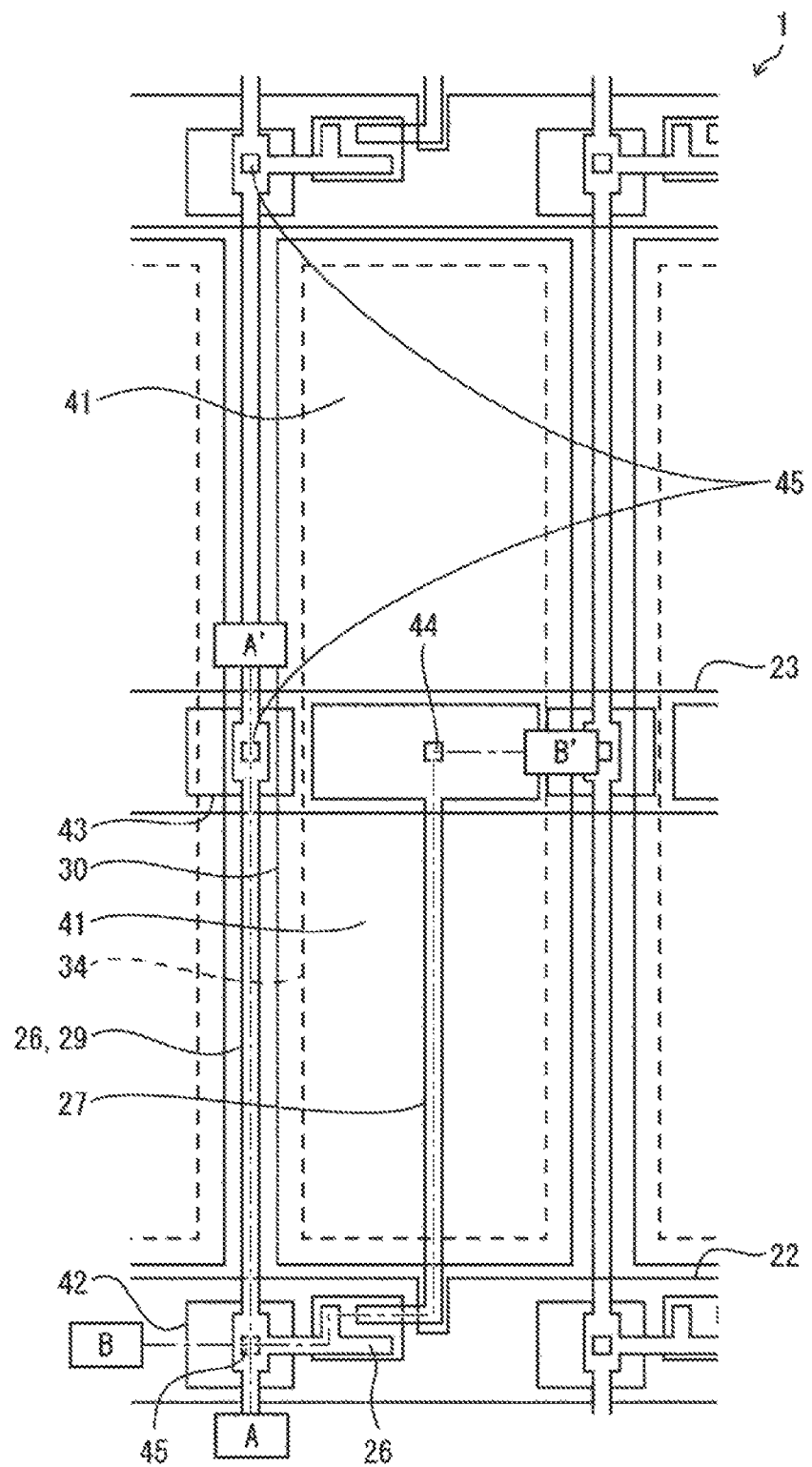
FIG. 2 is a plan view planarly illustrating a detailed configuration of a pixel.

FIG. 2 is a plan view planarly illustrating a detailed configuration of the pixel 15. As illustrated in the figure, in the pixel 15, a pixel aperture 41, a gate line aperture 42, and an auxiliary capacitance line aperture 43 are formed. The pixel aperture 41 is arranged at a position that faces a pixel electrode 30. The pixel electrode 30 is a transparent conductive film of, for example, ITO, IZO, or the like. The gate line aperture 42 is formed in each of intersection portions of the plurality of gate lines 22 and the plurality of lower-layer source lines 26. The auxiliary capacitance line aperture 43 is arranged in each of intersection portions of a plurality of auxiliary capacitance lines 23 and the plurality of lower-layer source lines 26.

Figure 3:
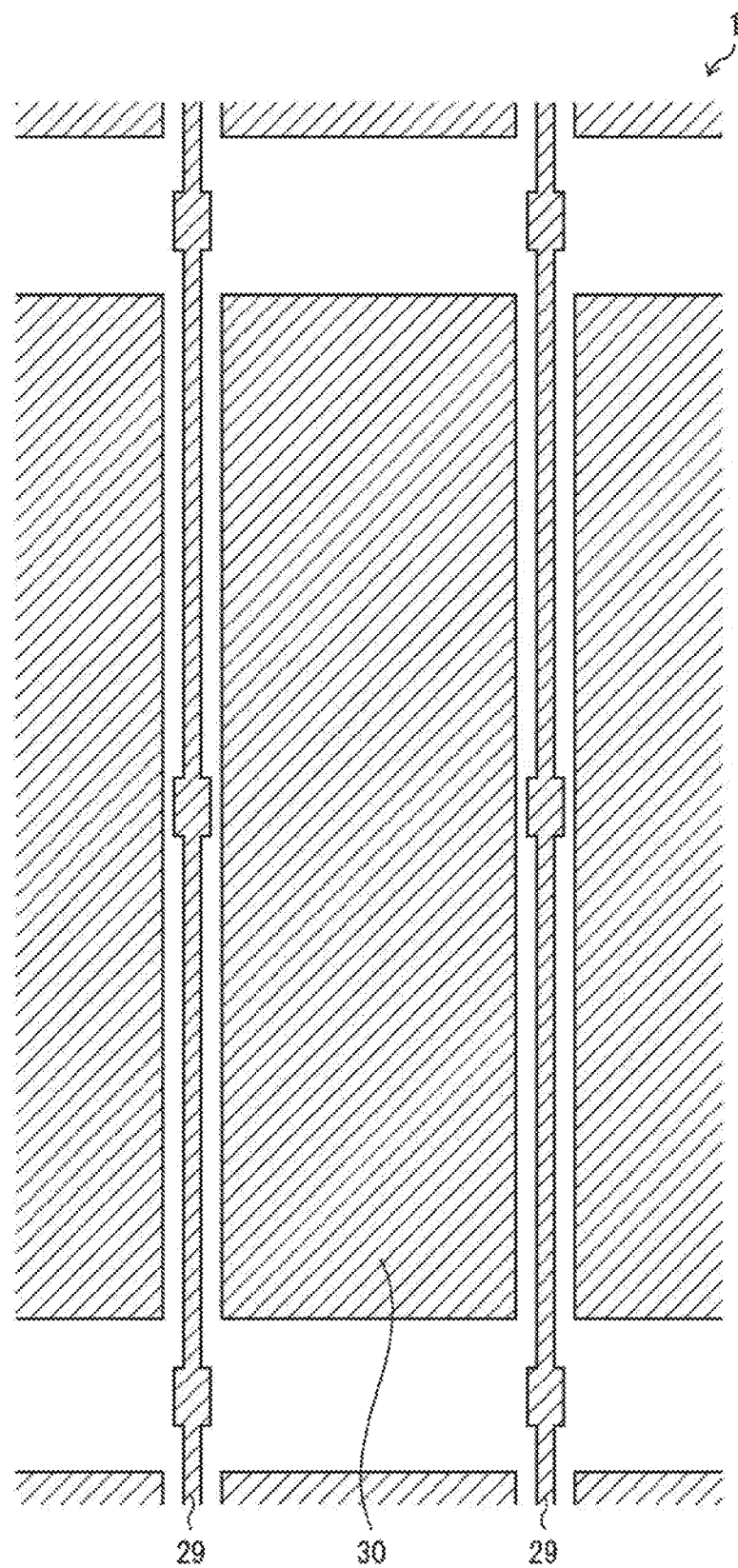
FIG. 3 is a plan view planarly illustrating a configuration of a pixel electrode.

FIG. 3 is a plan view planarly illustrating a configuration of the pixel electrode 30. As illustrated in the figure, the pixel electrode 30 is configured as a so-called solid electrode.

Figure 4:
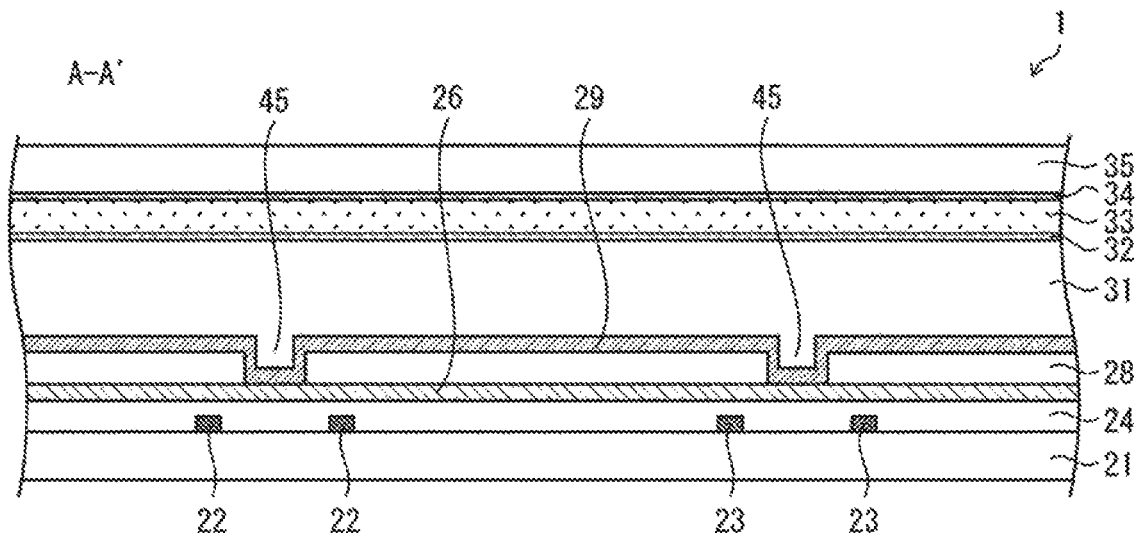
FIG. 4 is a sectional view illustrating a section of the liquid crystal panel, which is taken along a line A-A' illustrated in FIG. 2.
Figure 5:
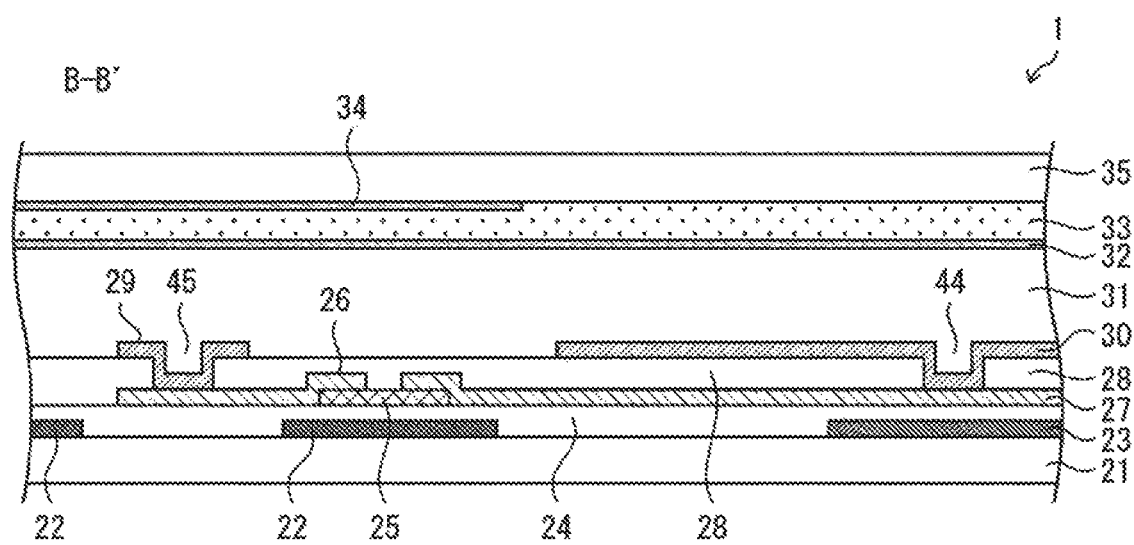
FIG. 5 is a sectional view illustrating a section of the liquid crystal panel, which is taken along a line B-B' illustrated in FIG. 2.

FIG. 4 is a sectional view illustrating a section of the liquid crystal panel 1, which is taken along a line A-A' illustrated in FIG. 2. FIG. 5 is a sectional view illustrating a section of the liquid crystal panel 1, which is taken along a line B-B' illustrated in FIG. 2. As illustrated in the figures, the liquid crystal panel 1 includes an array substrate 21 (first substrate), the gate lines 22, the auxiliary capacitance lines 23, a first inter-layer insulating film 24, a semiconductor layer 25, the lower-layer source lines 26, a drain electrode 27, a second inter-layer insulating film 28, the upper-layer source lines 29, the pixel electrode 30, liquid crystal 31, a common electrode 32, a color filter 33, a black matrix 34 (light shielding film), and a counter substrate 35 (second substrate). The common electrode 32 is a transparent conductive film of, for example, ITO, IZO, or the like.

The gate lines 22 and the auxiliary capacitance lines 23 are arranged on the array substrate 21. The gate lines 22 are arranged so as to extend in the horizontal direction. The auxiliary capacitance lines 23 are arranged in parallel to the gate lines 22. The first inter-layer insulating film 24 is arranged so as to cover the gate lines 22 and the auxiliary capacitance lines 23. The semiconductor layer 25, the lower-layer source lines 26, and the drain electrode 27 are arranged on the first inter-layer insulating film 24. The semiconductor layer 25 forms a TFT. The TFT is a member by which a signal of the pixel 15 is controlled, and is arranged near each of intersection points of the gate lines 22 and the lower-layer source lines 26.

The second inter-layer insulating film 28 is arranged so as to cover a part of the lower-layer source lines 26, an aperture of the semiconductor layer 25, and a part of the drain electrode 27. The upper-layer source lines 29 are arranged on the second inter-layer insulating film 28. A contact hole 45 (first contact hole) is formed in the gate line aperture 42, and, furthermore, the contact hole 45 (second contact hole) is formed also in the auxiliary capacitance line aperture 43. The upper-layer source lines 29 are connected to the lower-layer source lines 26 through contact holes 45. The lower-layer source lines 26 and the upper-layer source lines 29 are arranged at positions where the lower-layer source lines 26 and the upper-layer source lines 29 face each other. Note that, although being omitted in FIGS. 4, 5, and the like, an alignment film is formed in each of inner surfaces in the liquid crystal panel 1, which face the liquid crystal 31.

A pixel portion contact hole 44 is formed at any position in each of pixel apertures 41, and the pixel electrode 30 and the drain electrode 27 are connected through the pixel portion contact hole 44.

On the counter substrate 35, the color filter 33 and the black matrix 34 are arranged. On the color filter 33, the common electrode 32 is arranged. The liquid crystal 31 is arranged inside the liquid crystal panel 1, and held between the array substrate 21 and the counter substrate 35.

A pixel signal is input to the drain electrode 27 through the semiconductor layer 25. As a result, a signal potential of the pixel electrode 30 that is made conductive with the drain electrode 27 through the pixel portion contact hole 44 is determined. The liquid crystal 31 that is held between the common electrode 32 and the pixel electrode 30 is aligned on the basis of the potential of the pixel signal. A pixel transmission amount of light that is radiated from a backlight (not illustrated) which is arranged on a rear surface side of the liquid crystal panel 1 is controlled by respective polarizing plates on an array substrate 21 side and a counter substrate 35 side and the alignment of the liquid crystal 31.
(Process Flow)

Figure 6:
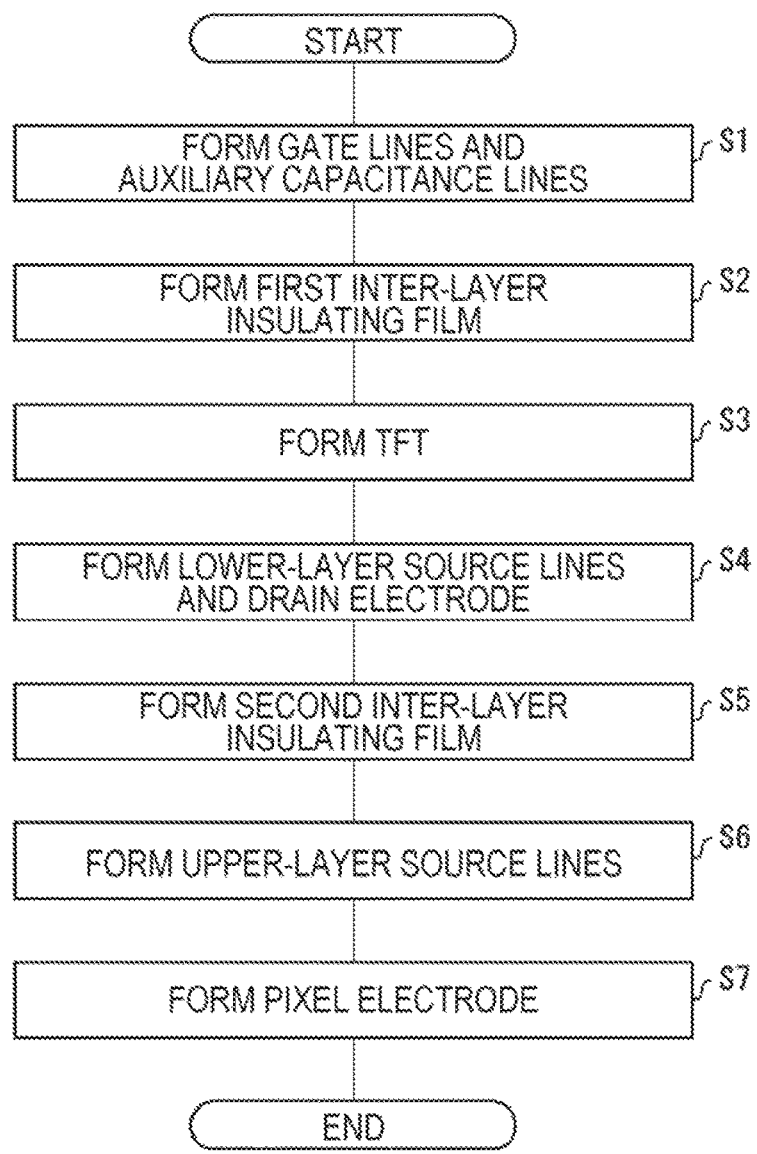
FIG. 6 is a flowchart for explaining a flow of processing in which gate lines and the like are formed on an array substrate.

FIG. 6 is a flowchart for explaining a flow of processing in which the gate lines and the like are formed on the array substrate 21. When the flow illustrated in the figure is started, first, the gate lines 22 are formed on a surface of the array substrate 21 (step S1). Next, the first inter-layer insulating film 24 is formed so as to cover the gate lines 22 (step S2). Then, the semiconductor layer 25 is formed on the first inter-layer insulating film 24 (step S3). Thereafter, the lower-layer source lines 26 and the drain electrode 27 are formed in the same layer as the semiconductor layer 25 (step S4). Next, the second inter-layer insulating film 28 is formed so as to cover the lower-layer source lines 26 and the like (step S5). Then, the upper-layer source lines 29 are formed on the second inter-layer insulating film 28 (step S6). Thereafter, the pixel electrode 30 is formed in the same layer as the upper-layer source lines 29 (step S7).

A wire material of the upper-layer source lines 29 is only required to be an Al-based or Cu-based material in order to lower resistance of the upper-layer source lines 29. Moreover, in order not to increase the number of masks or manufacturing processes at a time of manufacturing the liquid crystal panel 1, the upper-layer source lines 29 and the pixel electrode 30 may be formed of the same material at the same time.

At the time of manufacturing the liquid crystal panel 1, the contact hole 45 and the pixel portion contact hole 44 are able to be formed in the same photolithography process. Accordingly, a new process by which the contact hole 45 is formed is not necessarily required to be added to a manufacturing method of the liquid crystal panel 1.
(Current Path 52)

Figure 7:
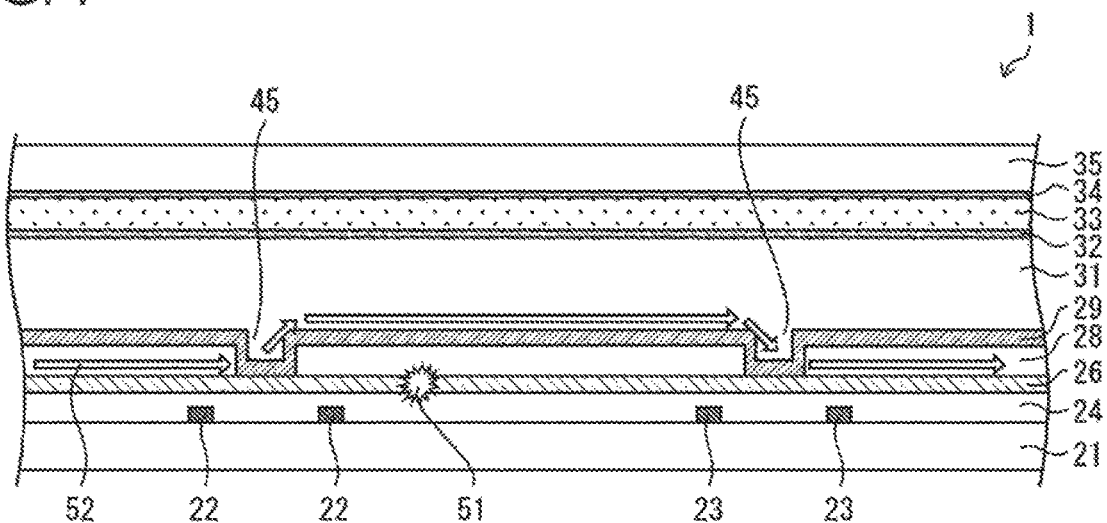
FIG. 7 is a view illustrating a current path in a case where disconnection occurs in a lower-layer source line.

FIG. 7 is a view illustrating a current path 52 in a case where disconnection 51 occurs in the lower-layer source line 26. As illustrated in the figure, in the liquid crystal panel 1, the lower-layer source line 26 and the upper-layer source line 29 are connected to each other through two contact holes 45. Thereby, the current path 52 that is connected to the upper-layer source line 29 from the lower-layer source line 26 and connected to the lower-layer source line 26 again is formed in the liquid crystal panel 1. As illustrated in FIG. 7, even in a case where the disconnection 51 occurs in the lower-layer source line 26, a current that is applied to the lower-layer source line 26 flows normally through the current path 52 and reaches to the semiconductor layer 25. Thus, it is possible to make the liquid crystal panel 1 have good quality, unless disconnection occurs in the lower-layer source line 26 and the upper-layer source line 29 at the same time.

As illustrated in FIG. 6, the gate line 22 is often a layer formed on the array substrate 21 first. Therefore, in a case where a line defect is caused in the gate line 22, after pattern formation of the gate line 22, the gate line 22 in which the line defect is caused is restored by performing laser repair restoration of the gate line 22 that is judged to be defective or by executing a photolithography process again, and it is thereby possible to make the liquid crystal panel 1 have good quality.

In a case where there is a pinhole or the like in the lower-layer source line 26, there is a possibility that, when the second inter-layer insulating film 28 is subjected to etching in an etching process of the second inter-layer insulating film 28, in which the contact hole 45 is formed, the first inter-layer insulating film 24 is also subjected to etching. In a case where such unnecessary etching actually occurs, there is a risk that short-circuit between the upper-layer source line 29 and the gate line 22 or the auxiliary capacitance line 23 is caused at a time of pattern formation of the upper-layer source line 29.

Figure 8:
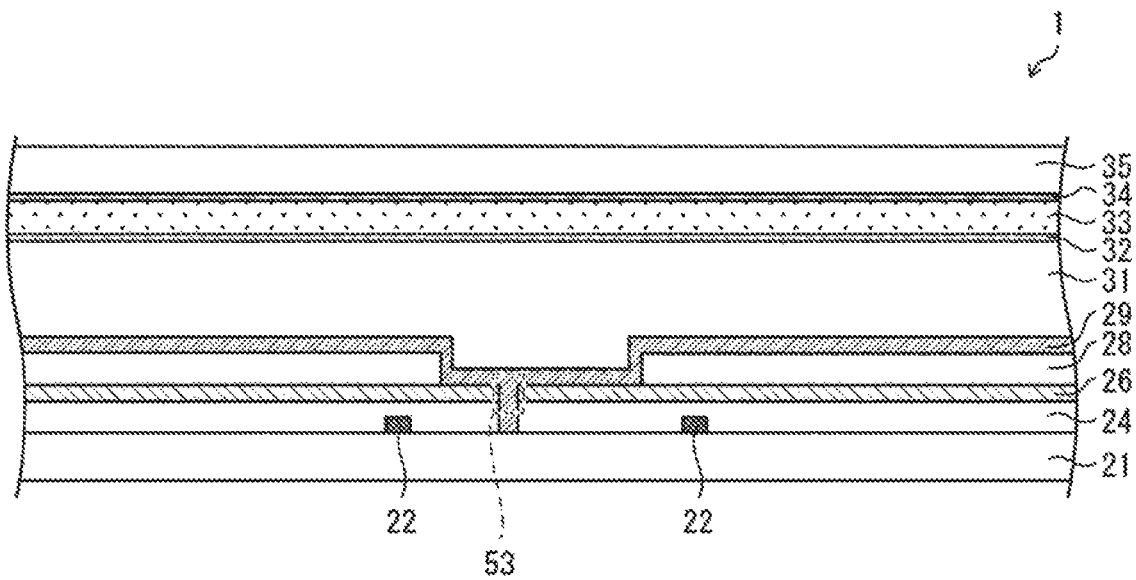
FIG. 8 is a view illustrating an example in which a pinhole is formed in the lower-layer source line, but short-circuit is not caused between an upper-layer source line and a gate line.

FIG. 8 is a view illustrating an example in which a pinhole 53 is formed in the lower-layer source line 26, but short-circuit is not caused between the upper-layer source line 29 and the gate line 22. In the figure, a position at which the contact hole 45 is formed does not face the gate line 22. In this case, even when the pinhole 53 is formed in the lower-layer source line 26, the upper-layer source line 29 contacts only the array substrate 21.

Figure 9:
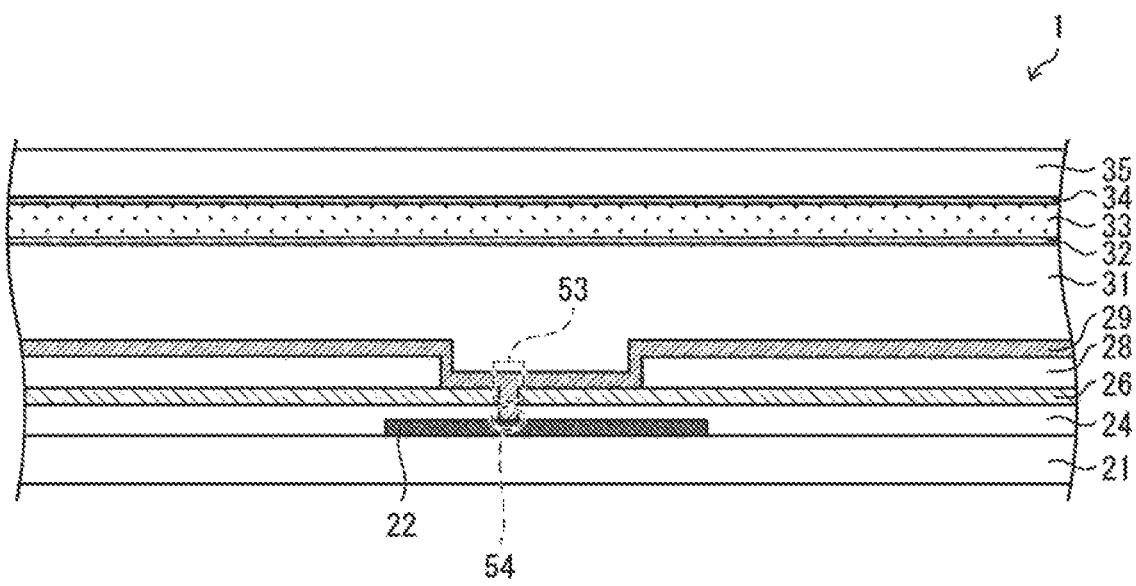
FIG. 9 is a view illustrating an example in which a pinhole is formed in the lower-layer source line, so that short-circuit is caused between the upper-layer source line and the gate line.

FIG. 9 is a view illustrating an example in which the pinhole 53 is formed in the lower-layer source line 26, so that short-circuit 54 is caused between the upper-layer source line 29 and the gate line 22. In the figure, the position at which the contact hole 45 is formed faces the gate line 22. In this case, when the pinhole 53 is formed in the lower-layer source line 26, the short-circuit 54 is caused between the upper-layer source line 29 and the gate line 22.
(Restoration of Liquid Crystal Panel 1)

Figure 10:
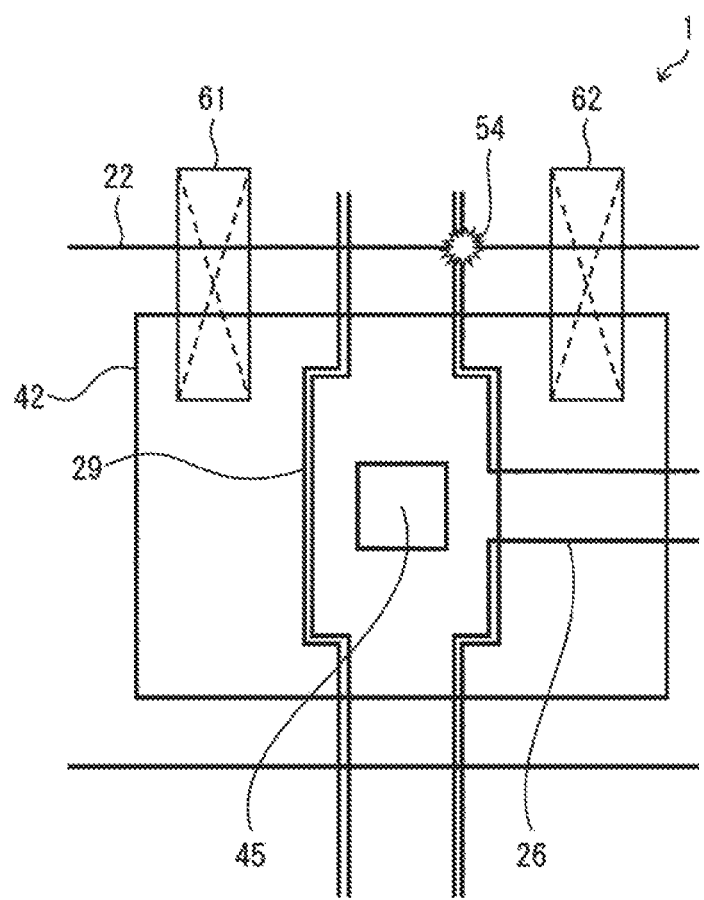
FIG. 10 is a view for explaining a first example of a method of restoring the liquid crystal panel in a case where short-circuit is caused.

FIG. 10 is a view for explaining a first example of a method of restoring the liquid crystal panel 1 in a case where the short-circuit 54 is caused. In the figure, the short-circuit 54 is caused between the lower-layer source line 26 and the gate line 22. In this case, when an object to be removed 62 near a part in which the short-circuit 54 in the gate line 22 is caused is cut off by a method of laser cut or the like by utilizing a fact that the gate line aperture 42 is formed in an intersection part of the lower-layer source line 26 and the gate line 22, it is possible to eliminate a line defect of the liquid crystal panel 1, thus making it possible to make the liquid crystal panel 1 have good quality.

Figure 11:
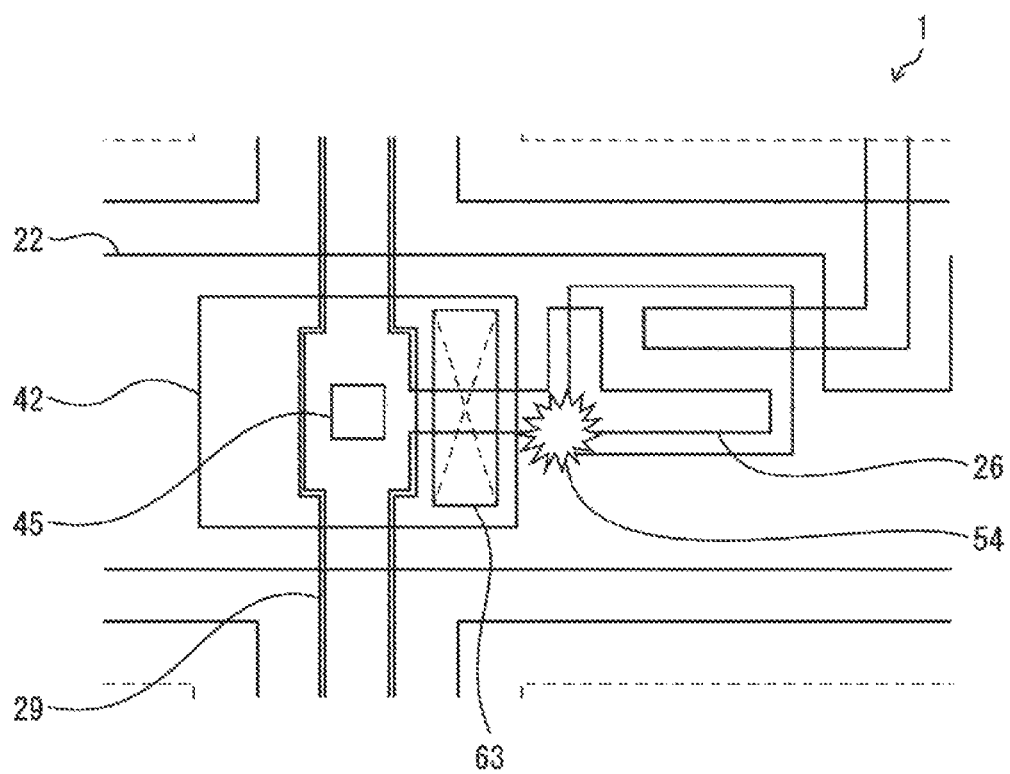
FIG. 11 is a view for explaining a second example of the method of restoring the liquid crystal panel in the case where short-circuit is caused.

FIG. 11 is a view for explaining a second example of the method of restoring the liquid crystal panel 1 in the case where the short-circuit 54 is caused. In the figure, the short-circuit 54 is caused between the lower-layer source line 26 and the gate line 22 near the semiconductor layer 25. In this case, when a connection portion 63 of the semiconductor layer 25 is cut off by a method of laser cut or the like, a line defect of the liquid crystal panel 1 is modified into a point defect, thus making it possible to make the liquid crystal panel 1 have good quality.

As illustrated in FIG. 2 and the like, in the liquid crystal panel 1, the contact hole 45 is formed also in an intersection part of the auxiliary capacitance line 23 and the gate line 22. Accordingly, also in a case where short-circuit is caused between the lower-layer source line 26 and the auxiliary capacitance line 23, it is possible to perform restoration similarly to the restoration of the short-circuit 54 between the lower-layer source line 26 and the gate line 22. Furthermore, by increasing the number of contact holes 45, it is possible to effectively increase redundancy between the lower-layer source line 26 and the upper-layer source line 29.

Figure 12:
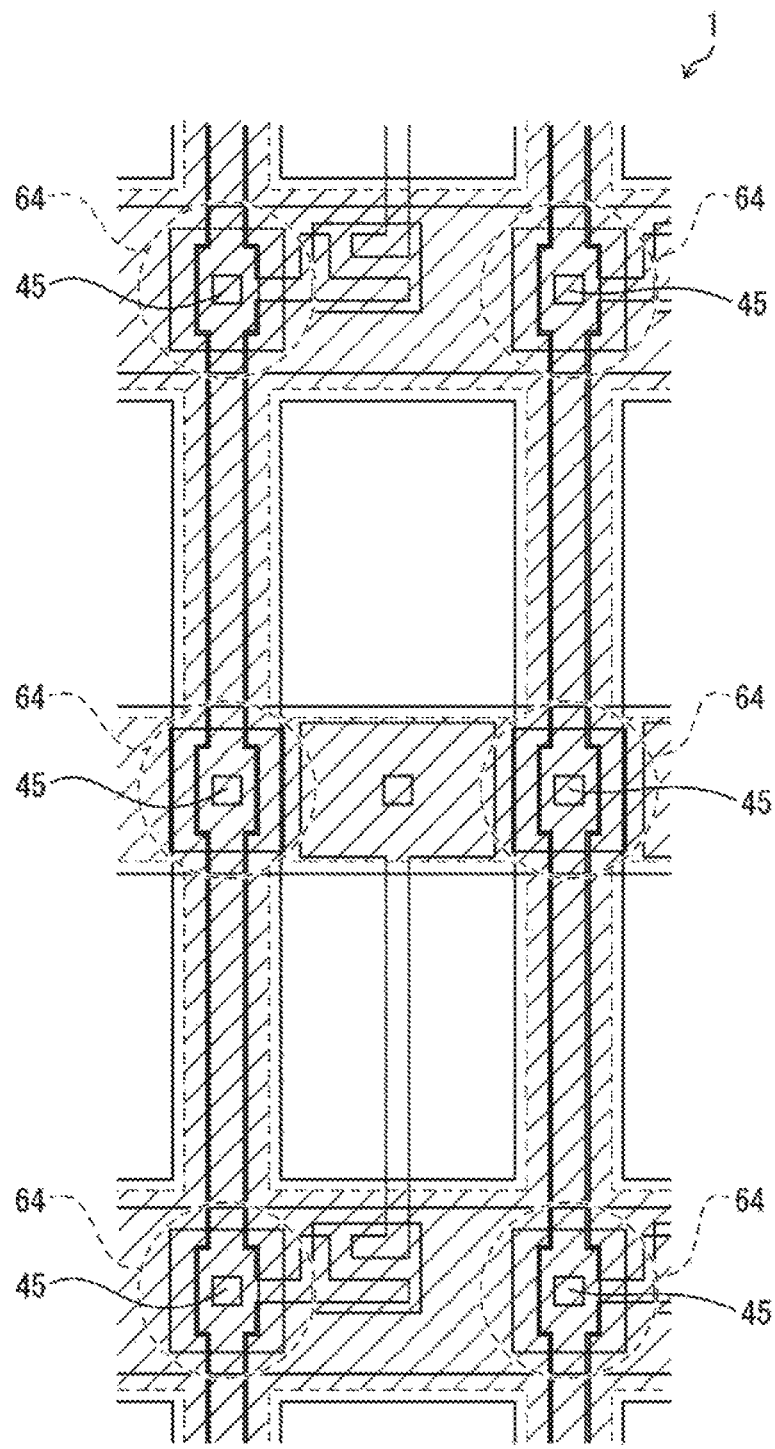
FIG. 12 is a view illustrating an alignment unstable region which is in a periphery of a contact hole.
Figure 13:
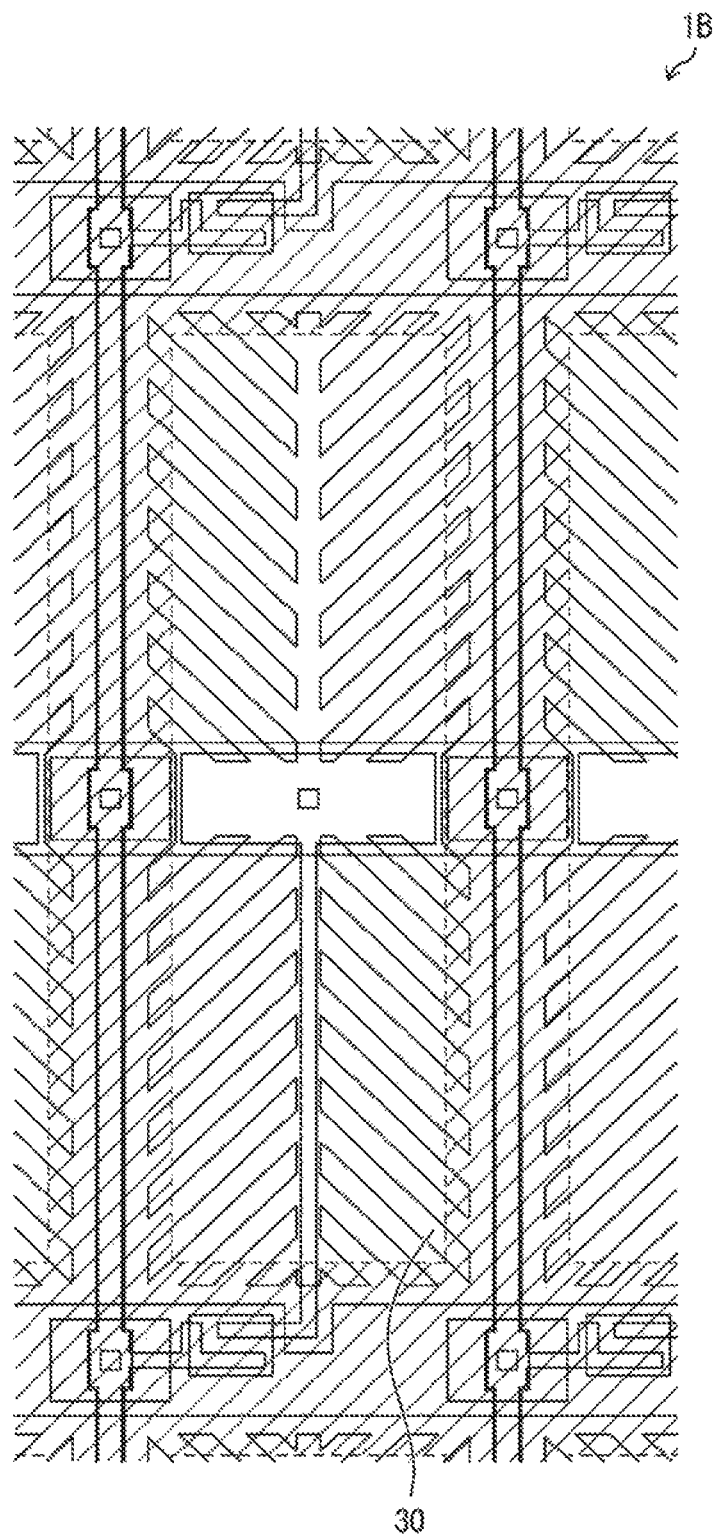
FIG. 13 is a plan view planarly illustrating a liquid crystal panel according to Embodiment 2 of the invention.

FIG. 12 is a view illustrating an alignment unstable region 64 which is in a periphery of the contact hole 45. Alignment of the liquid crystal 31 is affected by a sectional structure of the liquid crystal panel 1 and evenness of the alignment film. Accordingly, as illustrated in FIG. 12, alignment of the liquid crystal 31 in the alignment unstable region 64 which is in the periphery of the contact hole 45 recessed toward the array substrate 21 side is difficult to be controlled in many cases. As illustrated in FIG. 13, in the liquid crystal panel 1, the contact hole 45 is formed in the intersection portion (light shielding portion) which is apart from the pixel aperture 41, so that the alignment unstable region 64 is apart from the pixel aperture 41. It is therefore possible to stably control alignment of the liquid crystal 31 in the pixel aperture 41, thus making it possible to improve display quality of the liquid crystal panel 1.

As above, according to Embodiment 1, the liquid crystal panel 1 for which a decrease in a yield due to a line defect is suppressed and a high pixel aperture ratio is obtained is achieved. Furthermore, similarly to the liquid crystal panel 1, a liquid crystal display device (not illustrated) that includes the liquid crystal panel 1 also has an advantage that a decrease in a yield due to a line defect is suppressed and a high pixel aperture ratio is obtained.

Modified Example

It is preferable that the contact hole 45 is arranged near a center of the gate line aperture 42 (or the auxiliary capacitance line aperture 43). It is thereby possible to effectively prevent a decrease in the pixel aperture ratio and a decrease in the display quality.

In the liquid crystal panel 1, the gate line aperture 42 is not necessarily required to be provided in all intersection portions in which the plurality of gate lines 22 and the plurality of lower-layer source lines 26 intersect. In other words, the gate line aperture 42 is only required to be provided in at least any of all of the intersection portions, and therefore the contact hole 45 is also only required to be provided in at least any of all of the intersection portions. For example, the contact hole 45 may not be provided in a part in which a columnar spacer by which a cell thickness of the liquid crystal panel 1 is maintained is installed. In this case, since an installation area of the columnar spacer is not required to be reduced, the columnar spacer that has sufficient strength is able to be provided, and it is thereby possible to normally maintain the cell thickness of the liquid crystal panel 1.

Embodiment 2

Embodiment 2 according to the invention will be described below with reference to FIGS. 13 to 15. In the present embodiment, a member that is common to Embodiment 1 is given the same member number, and detailed description thereof will not be repeated unless otherwise required.
(Configuration of Liquid Crystal Panel 1B)

FIG. 13 is a plan view planarly illustrating a liquid crystal panel 1B according to Embodiment 2 of the invention. The liquid crystal panel 1B includes respective members that are the same as respective members constituting the liquid crystal panel 1 according to Embodiment 1. However, the liquid crystal panel 1B and the liquid crystal panel 1 are different in a shape of the pixel electrode 30.

Figure 14:
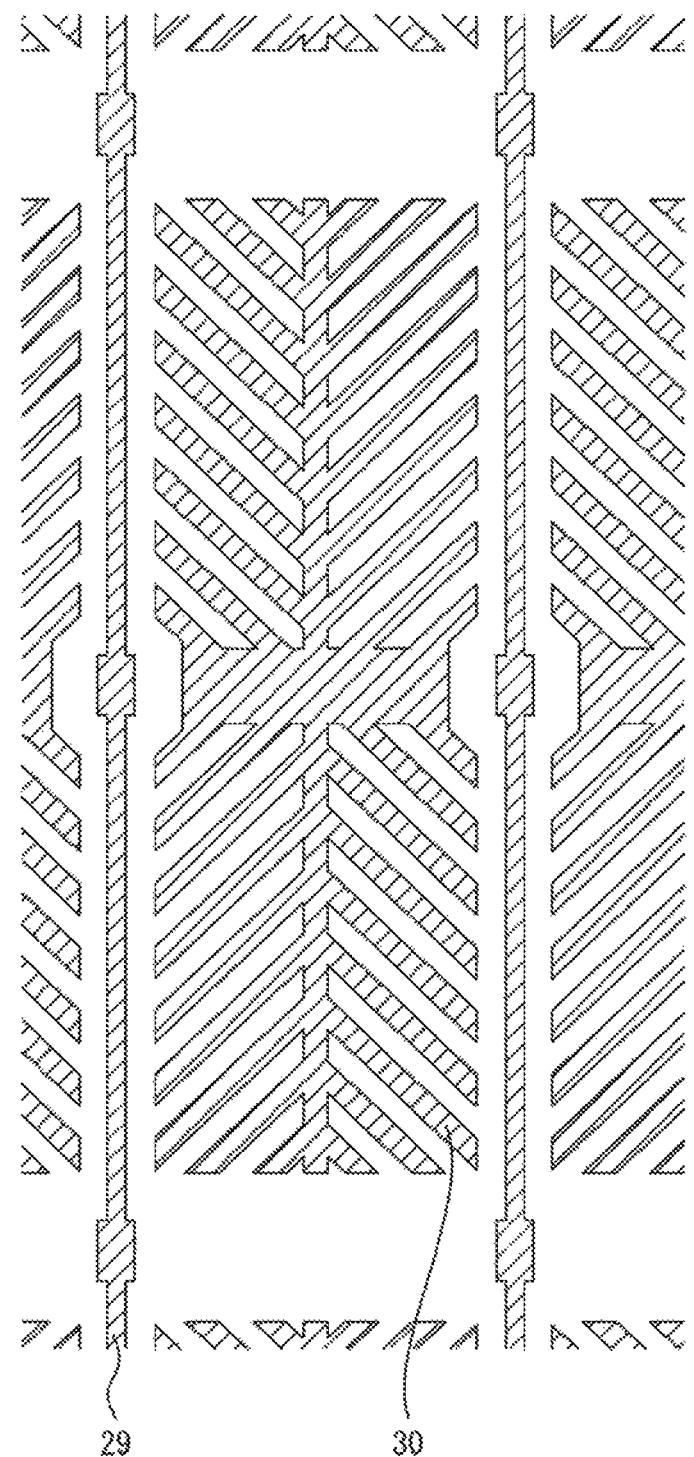
FIG. 14 is a plan view planarly illustrating a pixel electrode.

FIG. 14 is a plan view planarly illustrating the pixel electrode 30. As illustrated in the figure, the pixel electrode 30 has a so-called fish bone shape. The liquid crystal panel 1B operates in a VA (Vertical Alignment) mode. When a voltage is applied to the liquid crystal 31 that is controlled by a vertical alignment film, the liquid crystal 31 is aligned as if to fall down from ends of respective branch portions, which constitute the pixel electrode 30, toward an inner side of the pixel electrode 30.
(Alignment Direction of Liquid Crystal 31)

Figure 15:
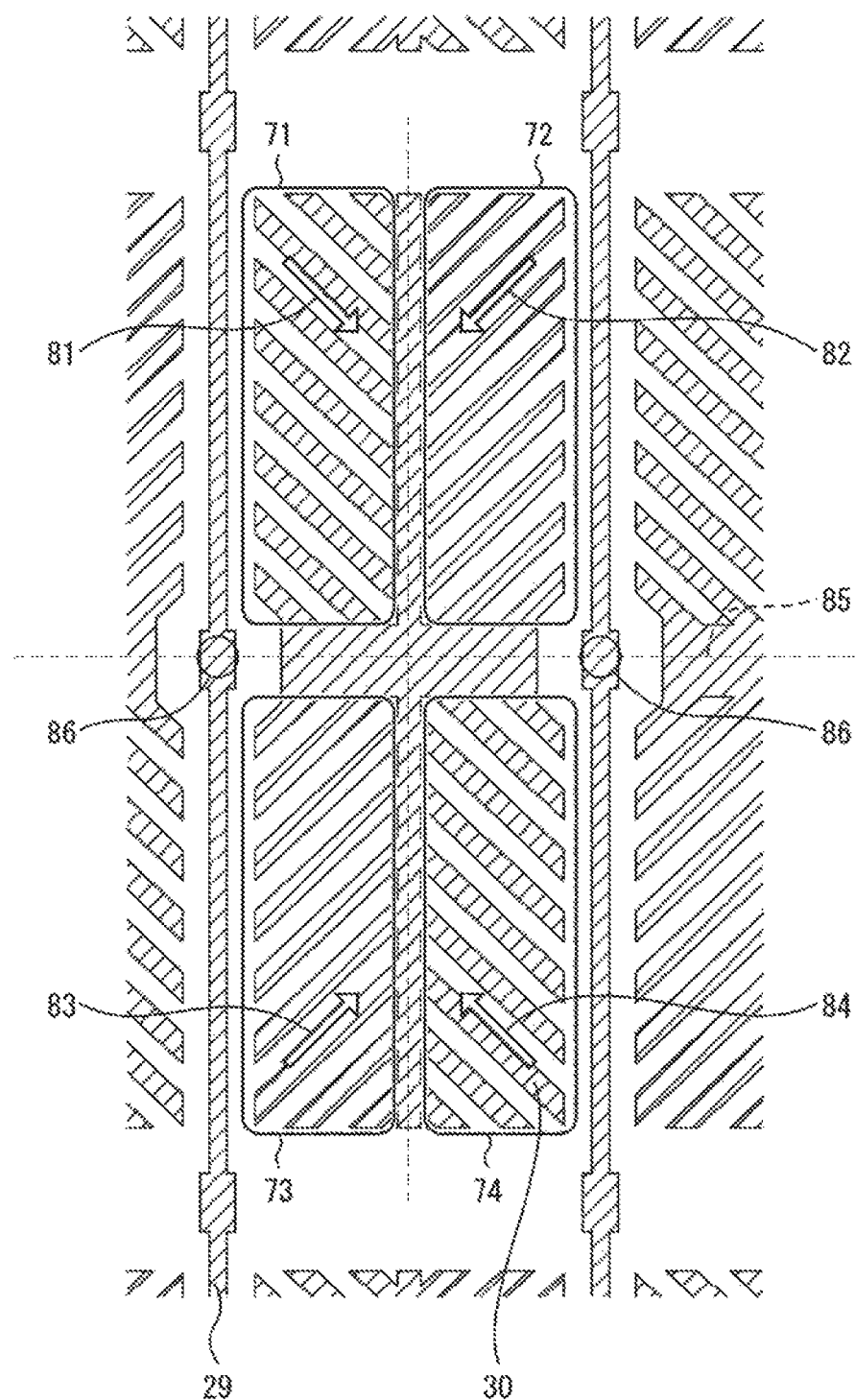
FIG. 15 is a view for explaining alignment of liquid crystal in a case where a voltage is applied to the pixel electrode.

FIG. 15 is a view for explaining alignment of the liquid crystal 31 in a case where a voltage is applied to the pixel electrode 30. As illustrated in the figure, the pixel electrode 30 is divided into four regions 71 to 74. When a voltage is applied to the liquid crystal 31, pieces of liquid crystal 31 which correspond to the regions 71 to 74 are aligned as if to respectively fall down in different alignment directions 81 to 84 that are inward directions of the pixel electrode 30. In the liquid crystal panel 1B, since alignment of the liquid crystal 31 is controlled in the four different directions, it is possible to reduce a view angle dependency of the liquid crystal 31, thus making it possible to achieve uniform display in a range of a wide view angle.

In a cross region 85 that serves as a trunk of the pixel electrode 30, the pieces of liquid crystal 31 are differently aligned and collide with each other, so that the cross region 85 often becomes a dark line in the liquid crystal panel 1B. The dark line means a part in which control of the liquid crystal 31 is difficult and therefore a sufficient light transmitting performance is not able to be obtained. In Embodiment 2, the contact hole 45 is provided in a pixel invalid region 86 that is an intersection point of the cross region 85 and the upper-layer source line 29. It is thereby possible to suppress a decrease in an aperture ratio of the pixel 15.

In the liquid crystal panel 1B, it is also possible to stabilize alignment of the liquid crystal 31 by PSA processing or the like. The PSA processing to be applied to the liquid crystal panel 1B means that a liquid crystal material including a monomer is enclosed in the liquid crystal panel 1B and polymerization of the liquid crystal 31 is accelerated in an interface of the alignment film, for example, by radiating ultraviolet rays in a state where a voltage is applied to the pixel 15. Thereby, in a liquid crystal mode in which the liquid crystal 31 is aligned with use of the vertical alignment film, the liquid crystal 31 is initially aligned with a fixed inclination angle. As a result, the alignment of the liquid crystal 31 is not unstable but stable, and display quality is improved. Furthermore, a response speed of display and light transmittance are improved as well.

Embodiment 3

Embodiment 3 according to the invention will be described below with reference to FIGS. 16 to 20. In the present embodiment, a member that is common to other embodiments is given the same member number, and detailed description thereof will not be repeated unless otherwise required.
(Configuration of Liquid Crystal Panel 1C)

Figure 16:
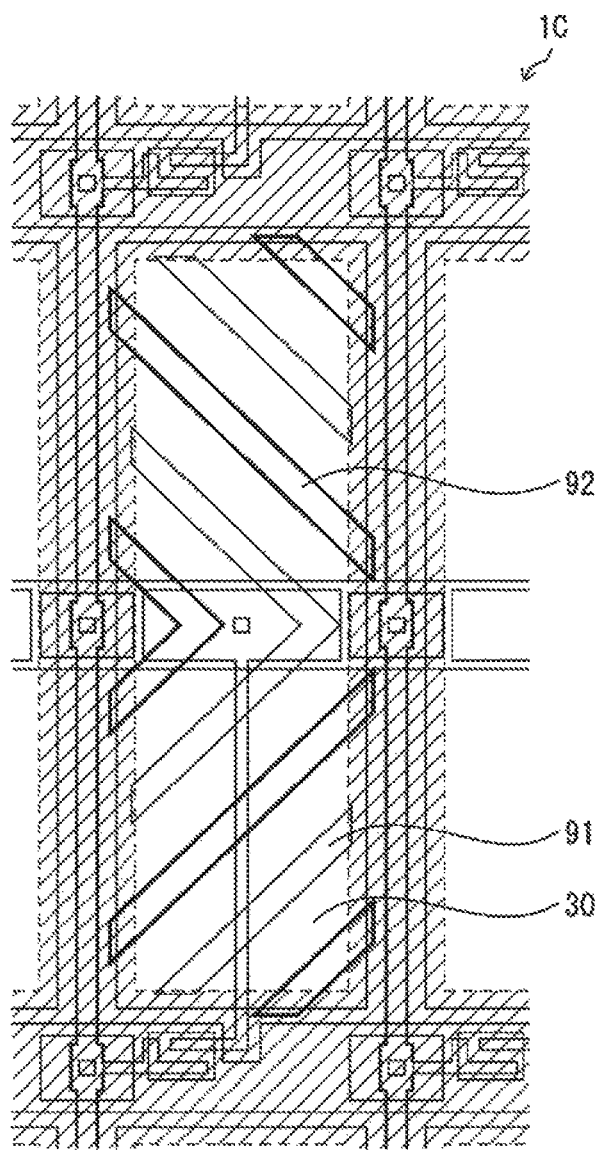
FIG. 16 is a plan view planarly illustrating a configuration of a liquid crystal panel according to Embodiment 3 of the invention.
Figure 17:
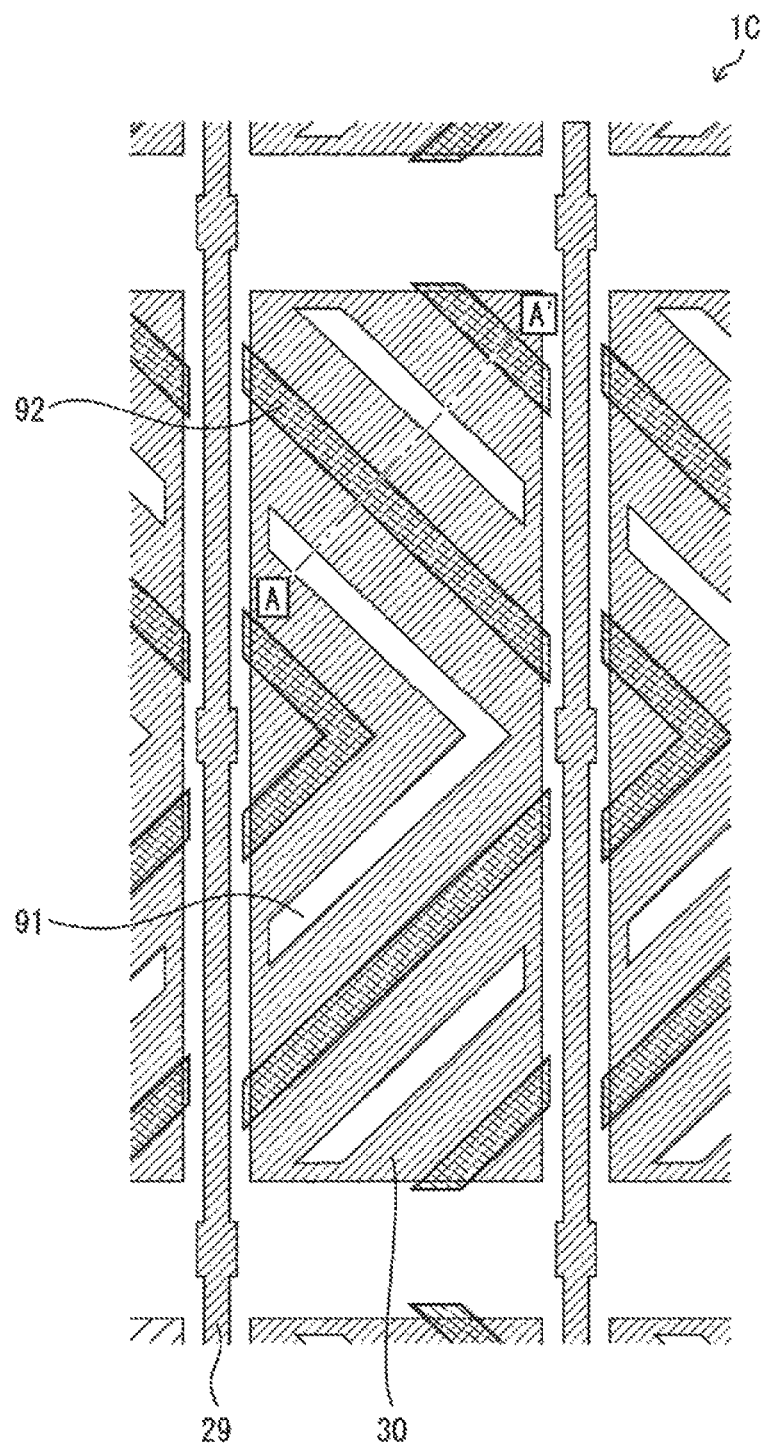
FIG. 17 is a plan view planarly illustrating a configuration of a pixel electrode that constitutes the liquid crystal panel.

FIG. 16 is a plan view planarly illustrating a configuration of a liquid crystal panel 1C according to Embodiment 3 of the invention. FIG. 17 is a plan view planarly illustrating a configuration of the pixel electrode 30 that constitutes the liquid crystal panel 1C. The liquid crystal panel 1C includes at least respective members that are the same as the respective members constituting the liquid crystal panel 1 according to Embodiment 1. However, the liquid crystal panel 1C and the liquid crystal panel 1 are different in a shape of the pixel electrode 30. The liquid crystal panel 1C is compatible with an MVA (Multiple Vertical Alignment) mode, and a slit 91 is formed in the pixel electrode 30. The liquid crystal panel 1C further includes an alignment control body 92 that is formed in the same layer as the common electrode 32.

Figure 18:
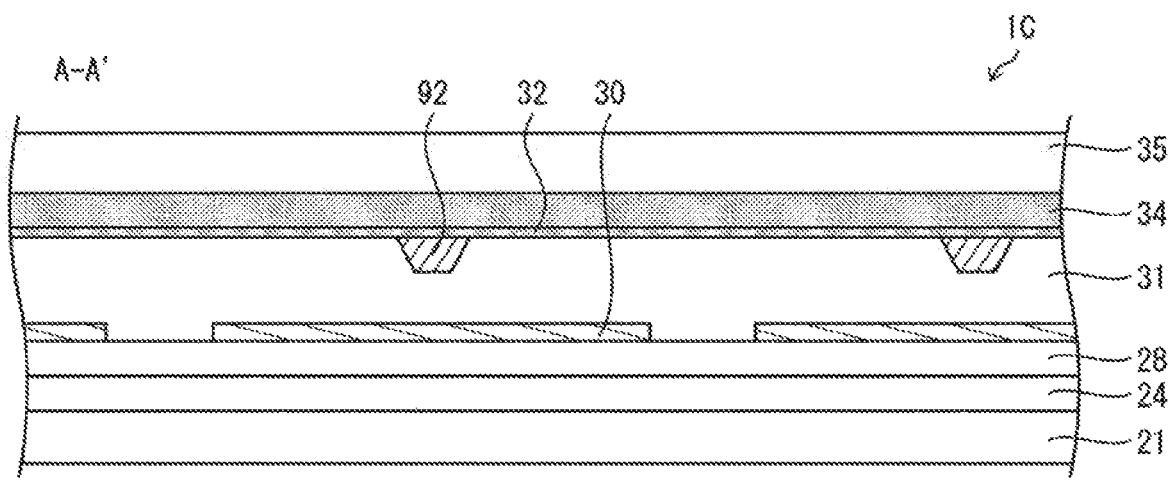
FIG. 18 is a sectional view illustrating a first example of a section of the liquid crystal panel, which is taken along a line A-A' illustrated in FIG. 17.
Figure 19:
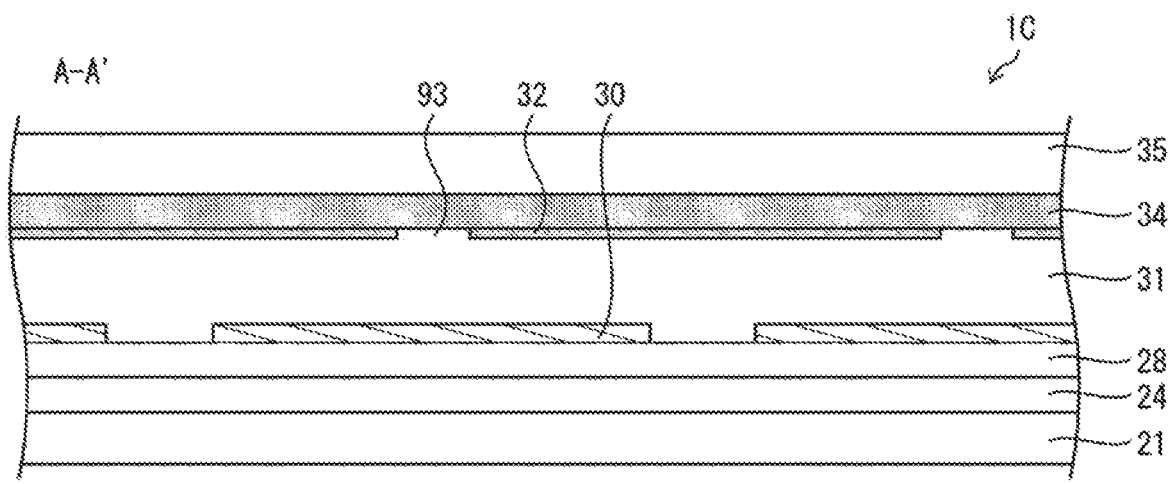
FIG. 19 is a sectional view illustrating a second example of the section of the liquid crystal panel, which is taken along the line A-A' illustrated in FIG. 17.

FIG. 18 is a sectional view illustrating a first example of a section of the liquid crystal panel 1C, which is taken along a line A-A' illustrated in FIG. 17. FIG. 19 is a sectional view illustrating a second example of the section of the liquid crystal panel 1C, which is taken along the line A-A' illustrated in FIG. 17. The alignment control body 92 may be a projection, which is made of resin, as illustrated in FIG. 18, or may be a slit, which is formed in the common electrode 32, as illustrated in FIG. 19. In both configurations, the alignment control body 92 has a function of controlling alignment of the liquid crystal 31 to which a voltage is applied.

(Alignment Direction of Liquid Crystal 31)

Figure 20:
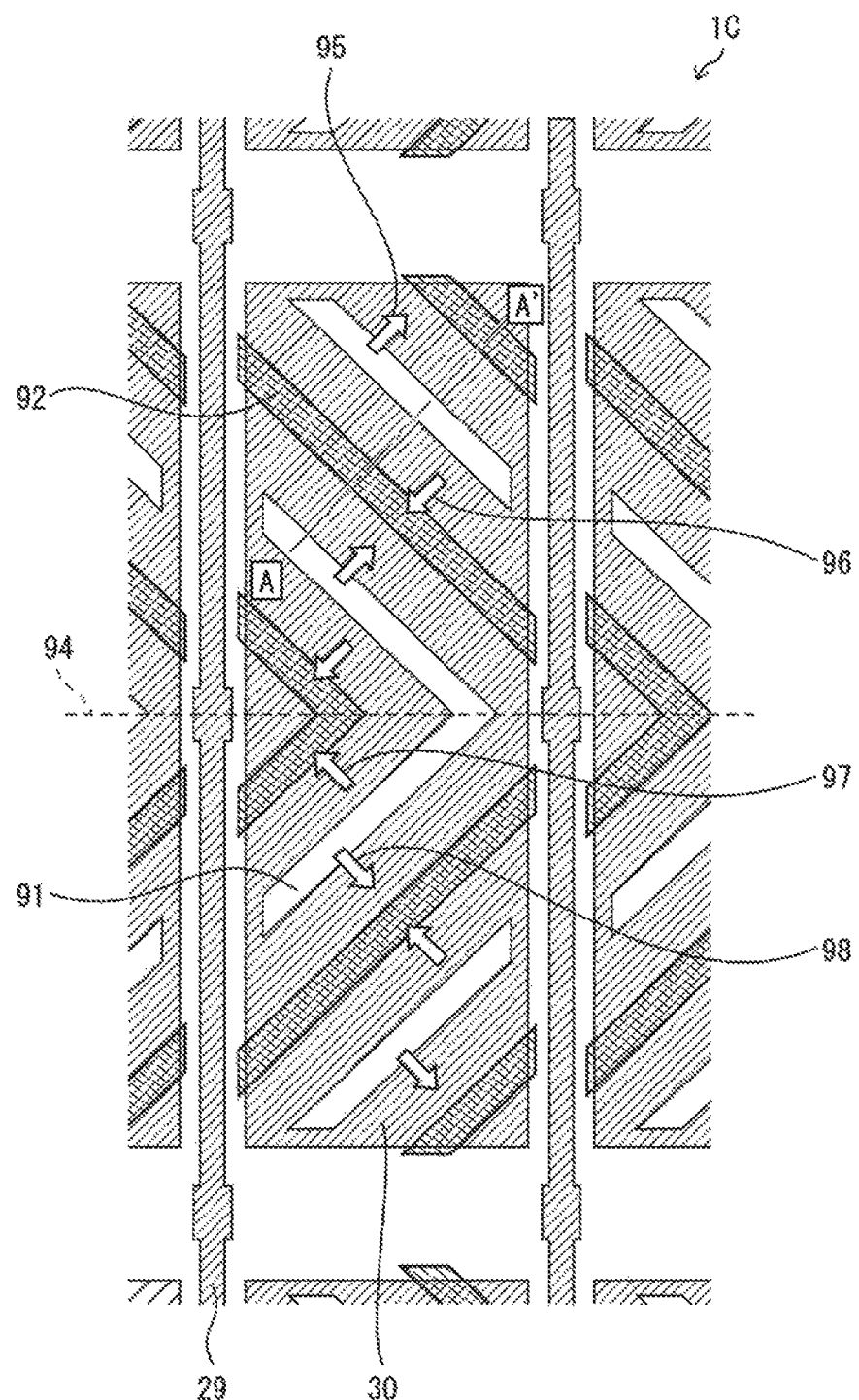
FIG. 20 is a view for explaining alignment of liquid crystal in a case where a voltage is applied to the pixel electrode.

FIG. 20 is a view for explaining alignment of liquid crystal 31 in a case where a voltage is applied to the pixel electrode 30. When a voltage is applied, in accordance with a position at which the liquid crystal 31 is arranged, the liquid crystal 31 is aligned in any of different alignment directions 95 to 98 heading to the alignment control body 92 from the slit 91. Engagement between an electric field which is generated in an edge of the slit 91 of the pixel electrode 30 and a direction in which the alignment control body 92 controls the liquid crystal 31 stabilizes alignment of the liquid crystal 31. The alignment of the liquid crystal 31 is stably controlled in the four different directions in the liquid crystal panel 1C, so that it is possible to reduce the view angle dependency of the liquid crystal 31. It is thereby possible to achieve the liquid crystal panel 1C that is capable of uniform display in a range of a wide view angle.

In the liquid crystal panel 1C that operates in the MVA mode, as illustrated in FIG. 20, the alignment direction of the liquid crystal 31 is different by 90° between an upper half region and a lower half region of the pixel electrode 30. Accordingly, an interface portion between the upper half region and the lower half region in the pixel electrode 30 becomes a dark line 94, in which the liquid crystal 31 is aligned in a collision manner, in many cases. The dark line 94 means a part in which control of the liquid crystal 31 is difficult and therefore a sufficient light transmitting performance is not able to be obtained. In Embodiment 3, the contact hole 45 is provided in a pixel invalid region that is an intersection point of the dark line 94 and the upper-layer source line 29. It is thereby possible to suppress a decrease in the aperture ratio of the pixel 15.

In the liquid crystal panel 1C, similarly to Embodiment 2, it is also possible to stabilize alignment of the liquid crystal 31 by the PSA processing or the like.

Embodiment 4

Embodiment 4 according to the invention will be described below with reference to FIGS. 21 to 25. In the present embodiment, a member that is common to other embodiments is given the same member number, and detailed description thereof will not be repeated unless otherwise required.

(Configuration of Liquid Crystal Panel 1D)

Figure 21:
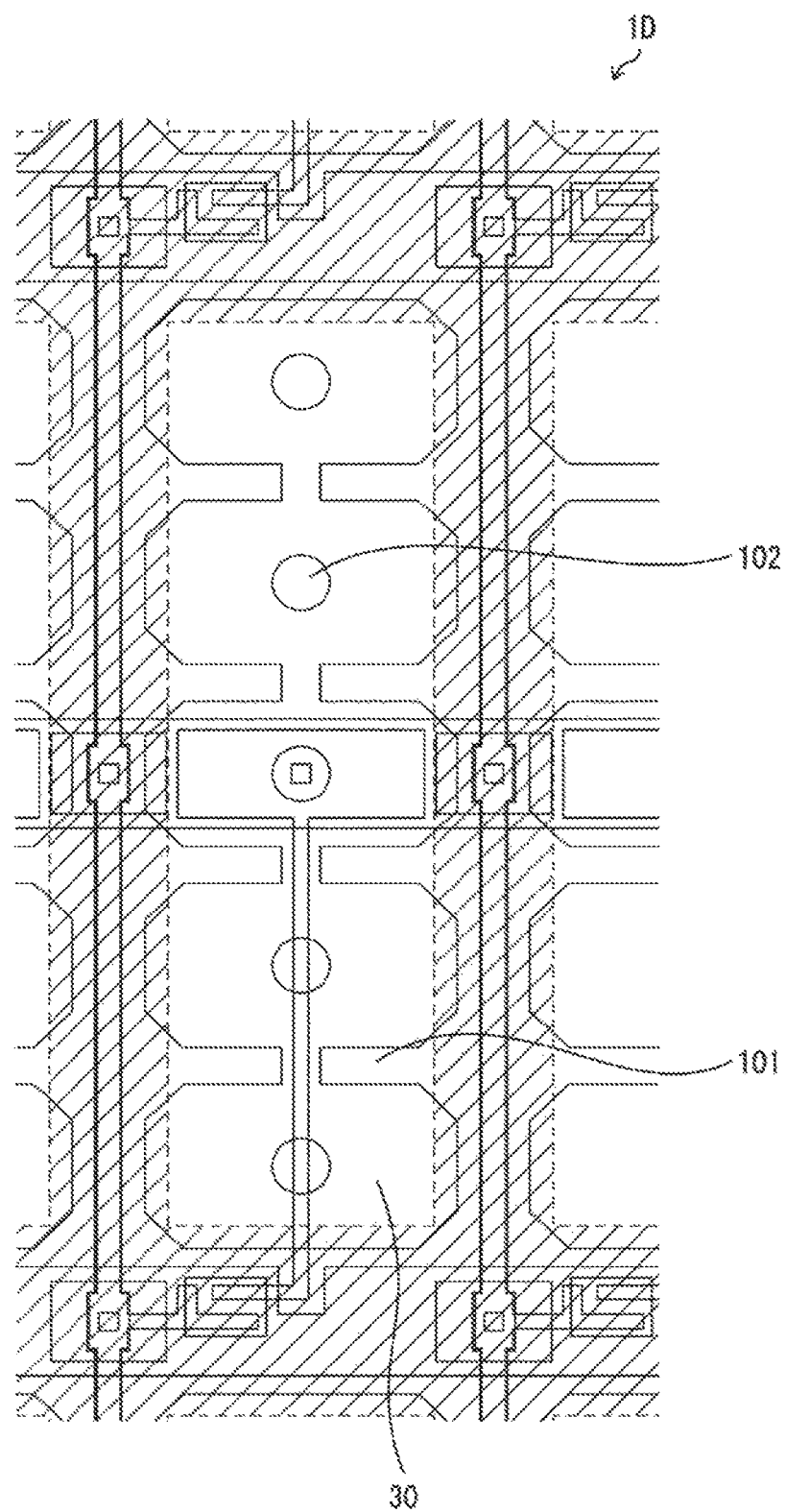
FIG. 21 is a plan view planarly illustrating a configuration of a liquid crystal panel according to Embodiment 4 of the invention.
Figure 22:
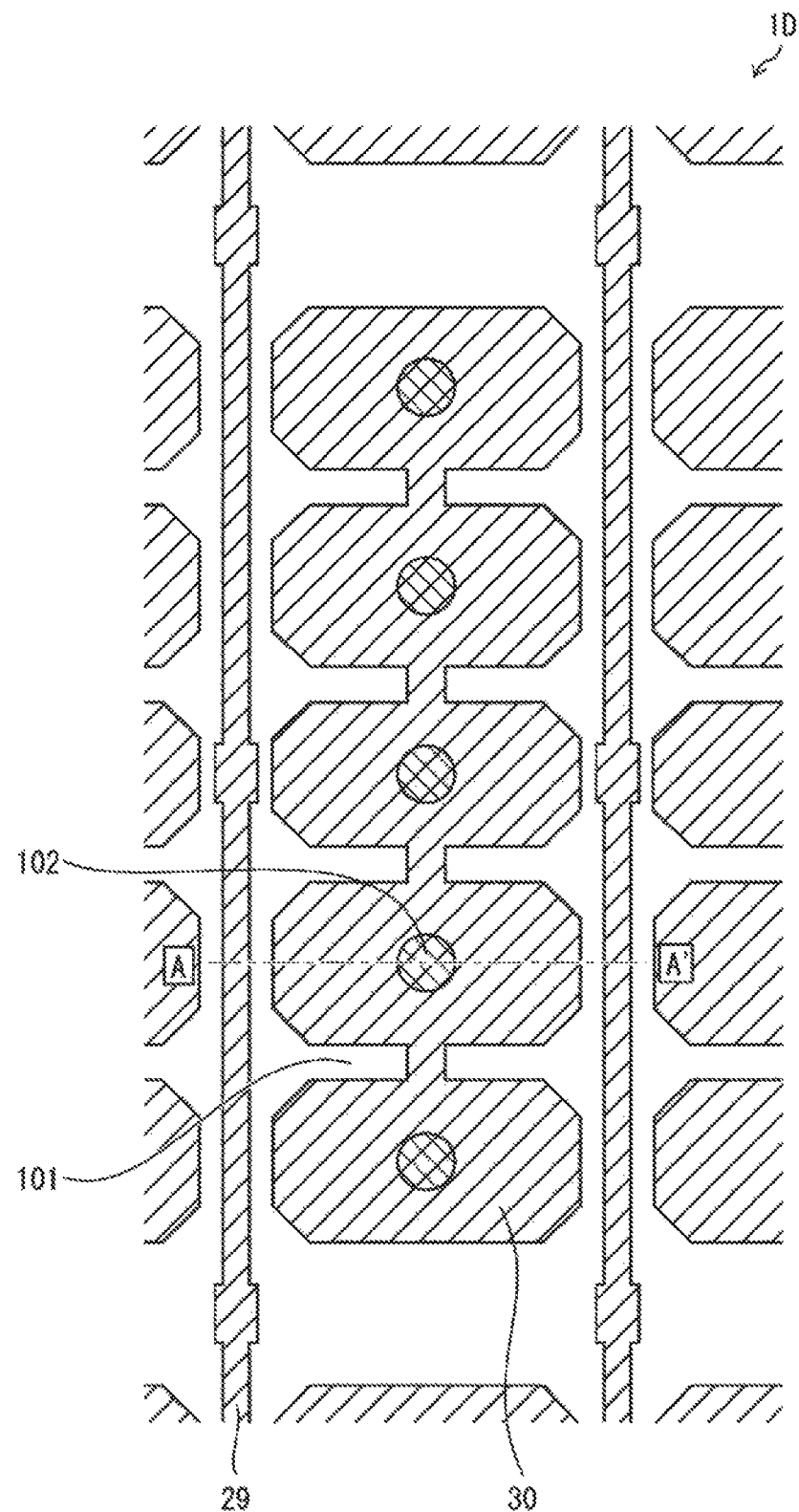
FIG. 22 is a plan view planarly illustrating a configuration of a pixel electrode.

FIG. 21 is a plan view planarly illustrating a configuration of a liquid crystal panel 1D according to Embodiment 4 of the invention. FIG. 22 is a plan view planarly illustrating a configuration of the pixel electrode 30. The liquid crystal panel 1D includes at least respective members that are the same as the respective members constituting the liquid crystal panel 1 according to Embodiment 1. However, the liquid crystal panel 1D and the liquid crystal panel 1 are different in a shape of the pixel electrode 30. The liquid crystal panel 1D is compatible with a CPA (Continuous Pinwheel Alignment) mode, and a slit 101 that is parallel to the gate line 22 is formed in the pixel electrode 30. The pixel electrode 30 is divided into five partial electrodes each of which has an octagonal shape. The liquid crystal panel 1D further includes an alignment control body 102 that is formed in the same layer as the common electrode 32.

Figure 23:
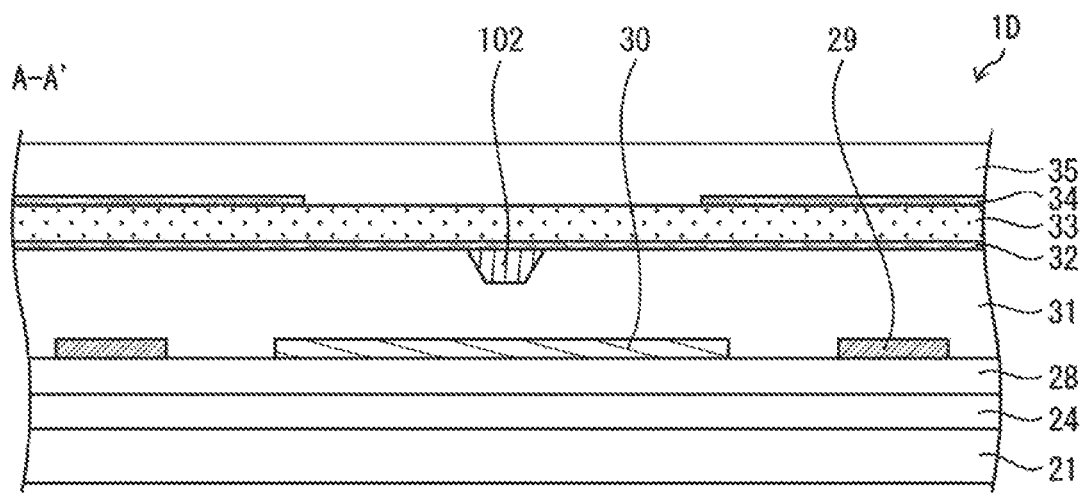
FIG. 23 is a sectional view illustrating a first example of a section of the liquid crystal panel, which is taken along a line A-A' illustrated in FIG. 22.
Figure 24:
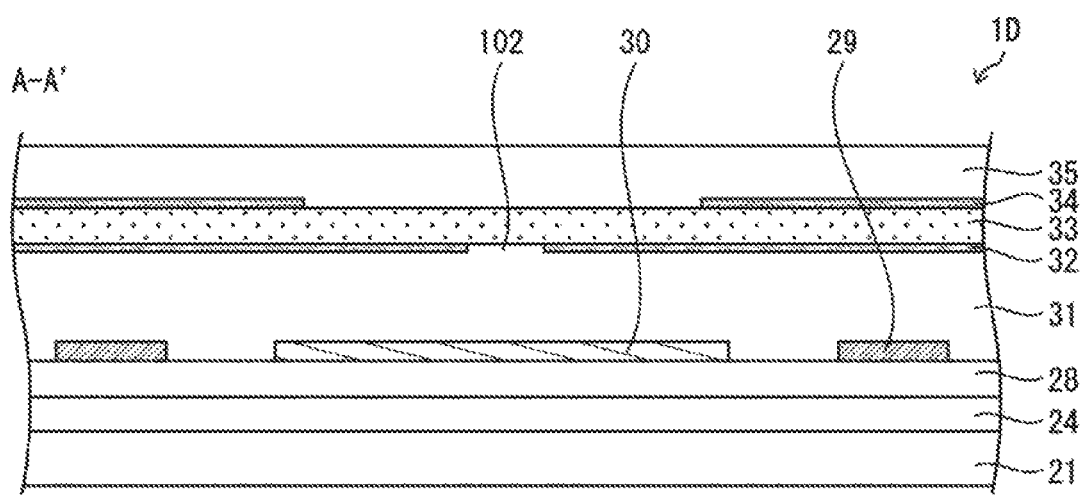
FIG. 24 is a sectional view illustrating a second example of the section of the liquid crystal panel, which is taken along the line A-A' illustrated in FIG. 22.

FIG. 23 is a sectional view illustrating a first example of a section of the liquid crystal panel 1D, which is taken along a line A-A' illustrated in FIG. 22. FIG. 24 is a sectional view illustrating a second example of the section of the liquid crystal panel 1D, which is taken along the line A-A' illustrated in FIG. 22. The alignment control body 102 may be a projection, which is formed on the common electrode 32 and made of resin, as illustrated in FIG. 23, or may be a slit, which is formed in the common electrode 32, as illustrated in FIG. 24. In both configurations, the alignment control body 102 has a function of controlling alignment of the liquid crystal 31 to which a voltage is applied.

(Alignment Direction of Liquid Crystal 31)

Figure 25:
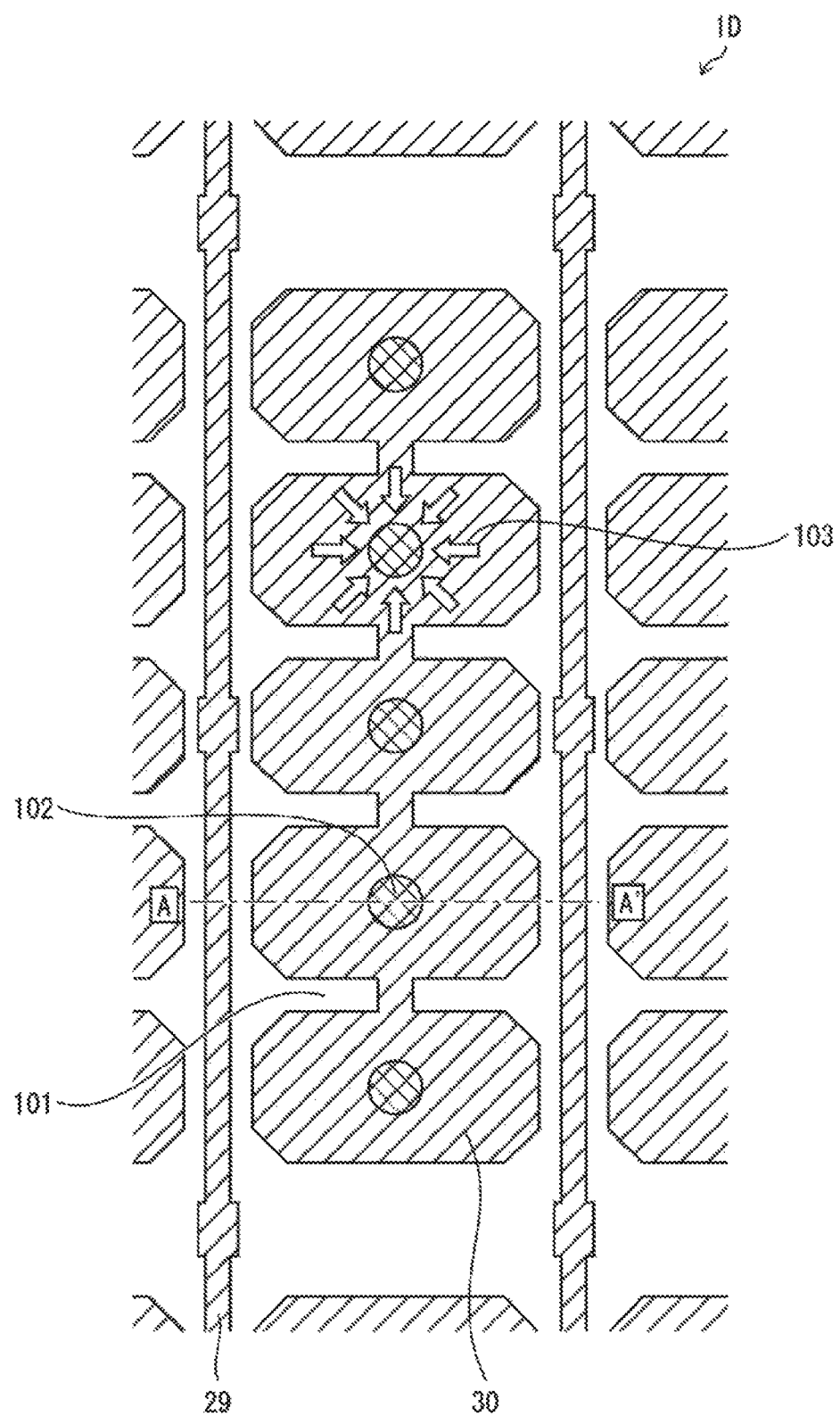
FIG. 25 is a view for explaining alignment of liquid crystal in a case where a voltage is applied to the pixel electrode.

FIG. 25 is a view for explaining alignment of the liquid crystal 31 in a case where a voltage is applied to the pixel electrode 30, When a voltage is applied, in accordance with a position at which the liquid crystal 31 is arranged, the liquid crystal 31 is aligned in any of a plurality of different alignment directions 103 heading to the alignment control body 102 from an edge of the pixel electrode 30. Engagement between an electric field which is generated in the edge of the pixel electrode 30 and a direction in which the alignment control body 102 controls the liquid crystal 31 stabilizes alignment of the liquid crystal 31. The alignment of the liquid crystal 31 is stably controlled in a large number of different alignment directions 103 in the liquid crystal panel 11), so that it is possible to reduce a view angle dependency of a displayed object in the liquid crystal panel 1D. It is thereby possible to achieve the liquid crystal panel 1D that is capable of uniform display in a range of a wide view angle.

In the liquid crystal panel 1D that operates in the CPA mode, similarly to Embodiment 1 and the like, the contact hole 45 is formed in each of an intersection portion of the gate line 22 and the lower-layer source line 26 and an intersection portion of the gate line 22 and the auxiliary capacitance line 23. Thereby, a loss portion is able to be shared, thus making it possible to improve light transmittance of the pixel electrode 30.

In the liquid crystal panel 1D, similarly to Embodiment 2 and the like, it is also possible to stabilize alignment of the liquid crystal 31 by the PSA processing or the like.

Embodiment 5

Embodiment 5 according to the invention will be described below with reference to FIGS. 26 to 31. In the present embodiment, a member that is common to other embodiments is given the same member number, and detailed description thereof will not be repeated unless otherwise required.

(Configuration of Liquid Crystal Panel 1E)

Figure 26:
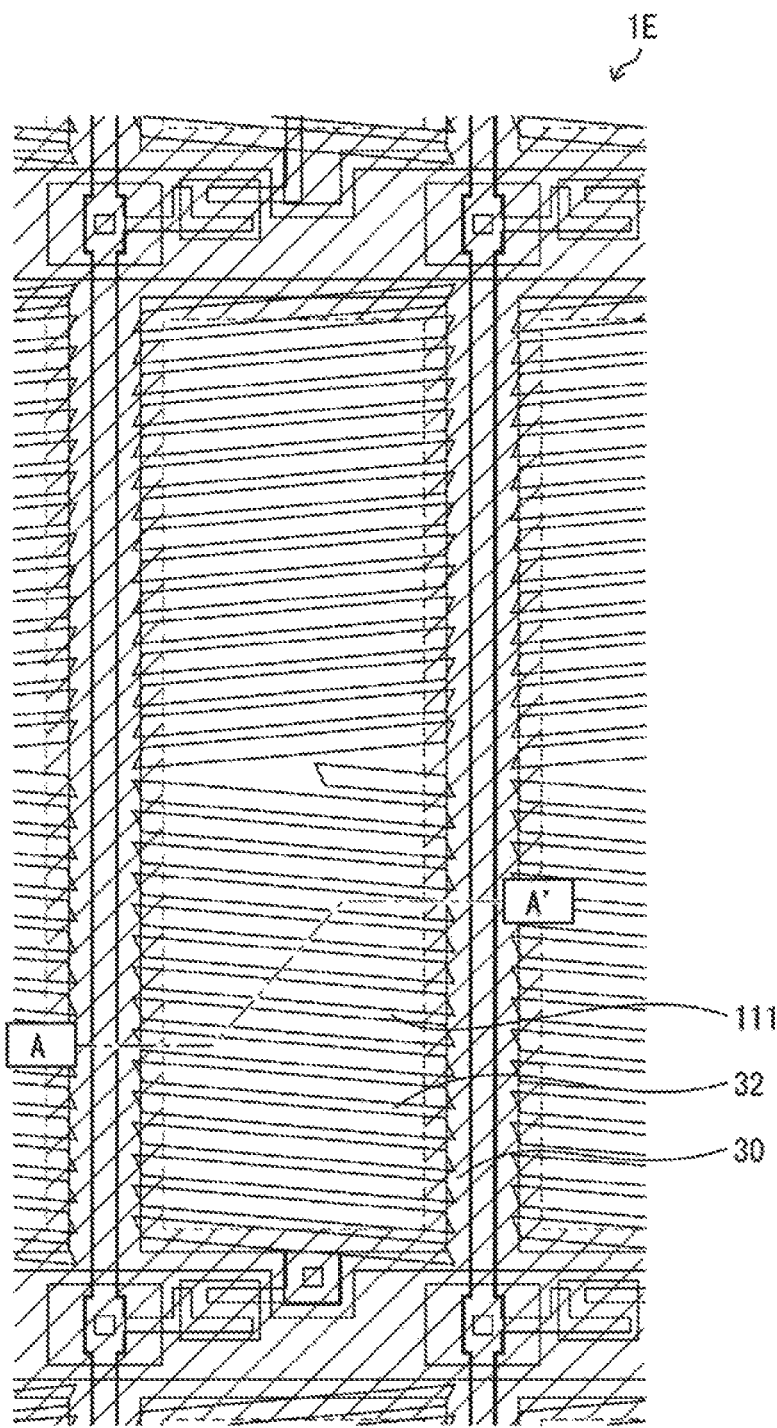
FIG. 26 is a plan view planarly illustrating a configuration of a liquid crystal panel according to Embodiment 5 of the invention.
Figure 27:
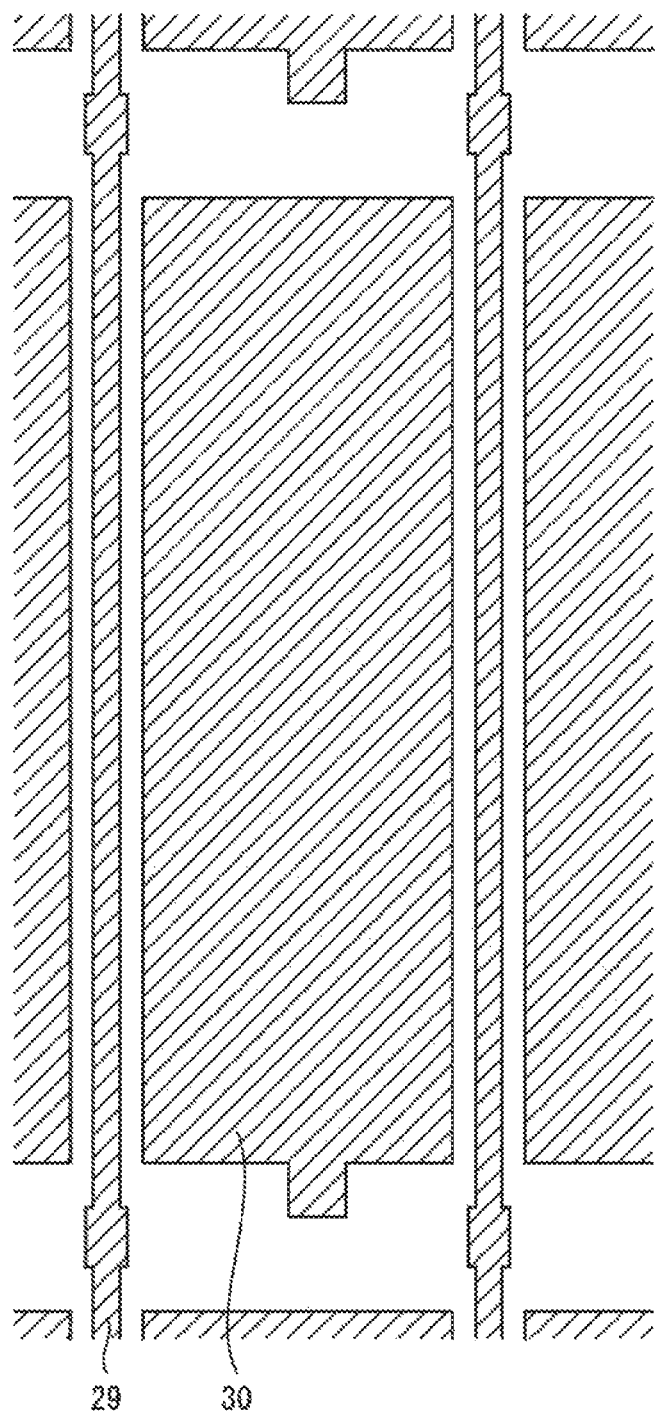
FIG. 27 is a plan view planarly illustrating a configuration of a pixel electrode.
Figure 28:
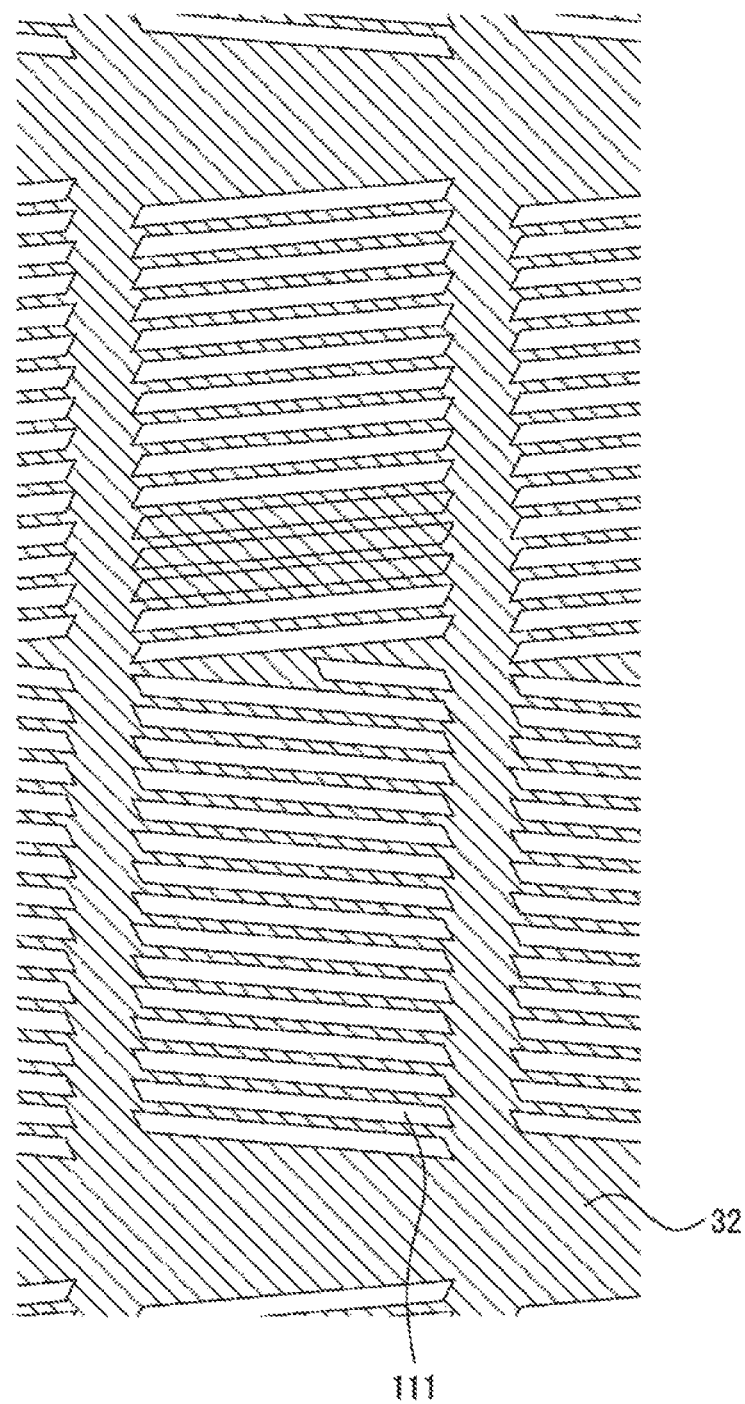
FIG. 28 is a plan view planarly illustrating a configuration of a common electrode.

FIG. 26 is a plan view planarly illustrating a configuration of a liquid crystal panel 1E according to Embodiment 5 of the invention. FIG. 27 is a plan view planarly illustrating a configuration of the pixel electrode 30. FIG. 28 is a plan view planarly illustrating a configuration of the common electrode 32. The liquid crystal panel 1E includes at least respective members that are the same as the respective members constituting the liquid crystal panel 1 according to Embodiment 1. However, the liquid crystal panel 1E and the liquid crystal panel 1 are different in an alignment mode of the liquid crystal 31. The liquid crystal panel 1E is compatible with a transverse electric field, that is, FFS (Fringe Field Switching) mode. A shape of the pixel electrode 30 is the same as that of Embodiment 1. A slit 111 that has a fixed inclination angle with respect to the gate line 22 and is substantially parallel to the horizontal direction (arrangement direction of the gate line 22) is formed in the common electrode 32.

Figure 29:
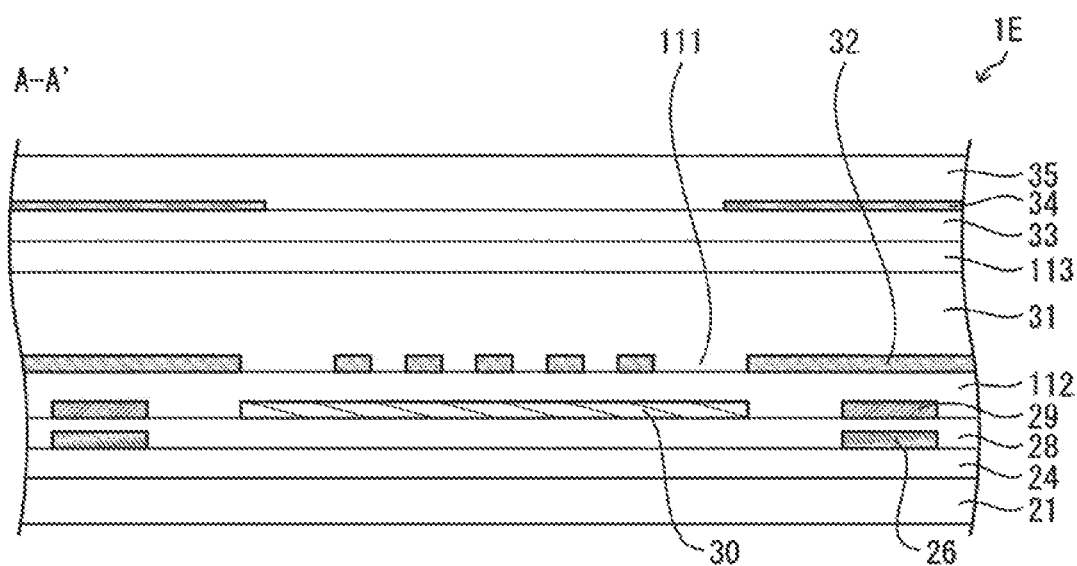
FIG. 29 is a sectional view illustrating a section of the liquid crystal panel, which is taken along a line A-A' illustrated in FIG. 26.

FIG. 29 is a sectional view illustrating a section of the liquid crystal panel 1E, which is taken along a line A-A' illustrated in FIG. 26. The liquid crystal panel 1E further includes a third inter-layer insulating film 112 and a flattening film 113. The third inter-layer insulating film 112 is formed on the second inter-layer insulating film 28 so as to cover each of the pixel electrode 30 and the upper-layer source line 29. The common electrode 32 is not formed on the counter substrate 35 but is formed on the third inter-layer insulating film 112. The flattening film 113 is formed on the color filter 33.

(Process Flow)

Figure 30:
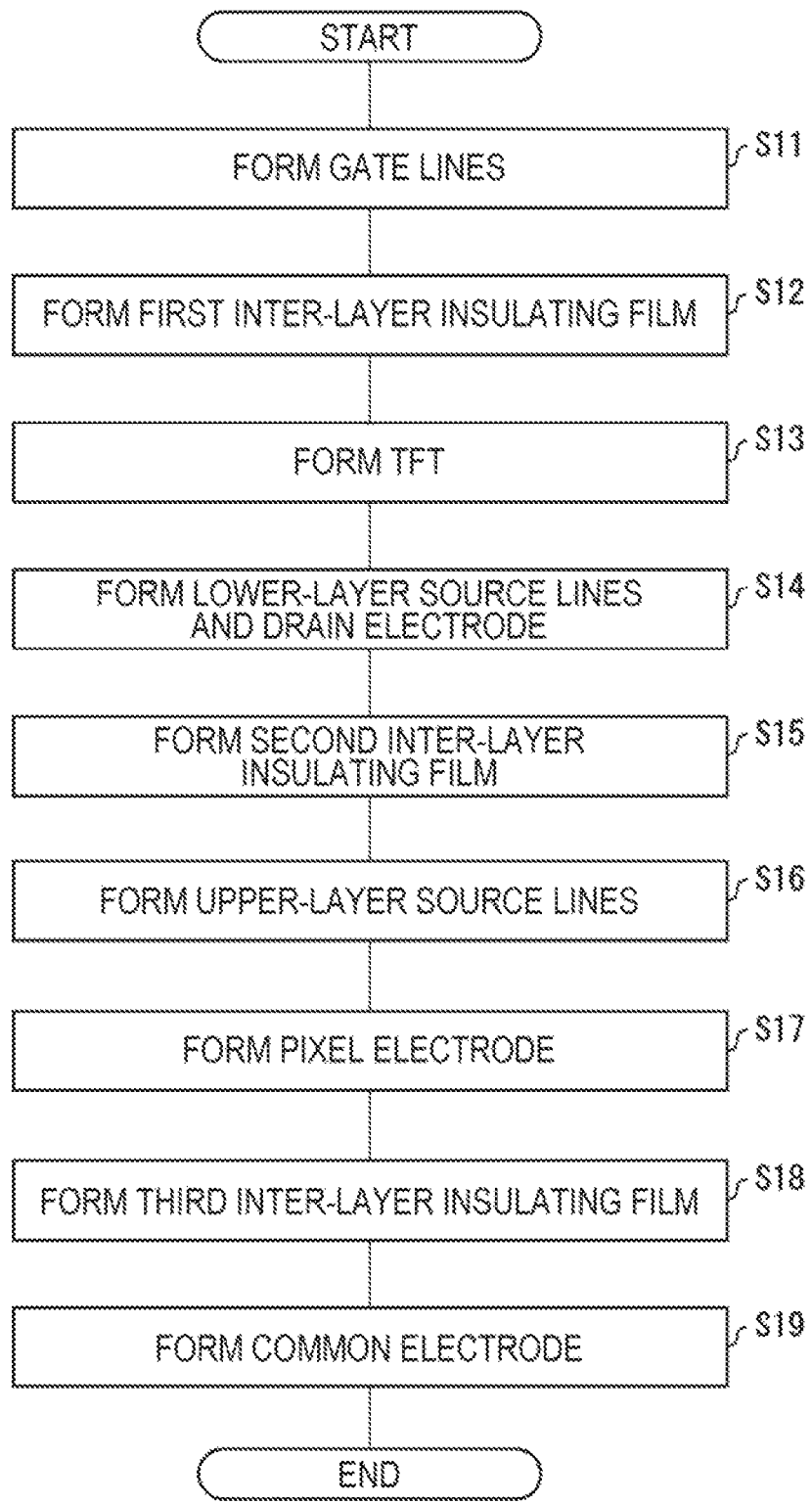
FIG. 30 is a flowchart for explaining a flow of processing in which gate lines and the like are formed on an array substrate.

FIG. 30 is a flowchart for explaining a flow of processing in which the gate lines and the like are formed on the array substrate 21. When the flow illustrated in the figure is started, first, the gate lines 22 are formed on the surface of the array substrate 21 (step S11). Next, the first inter-layer insulating film 24 is formed so as to cover the gate lines 22 (step S12). Then, the semiconductor layer 25 is formed on the first inter-layer insulating film 24 (step S13). Thereafter, the lower-layer source lines 26 and the drain electrode 27 are formed in the same layer as the semiconductor layer 25 (step S14). Next, the second inter-layer insulating film 28 is formed so as to cover the lower-layer source lines 26 and the like (step S15). Then, the upper-layer source lines 29 are formed on the second inter-layer insulating film 28 (step S16). Thereafter, the pixel electrode 30 is formed in the same layer as the upper-layer source lines 29 (step S17). Next, the third inter-layer insulating film 112 is formed so as to cover the pixel electrode 30 and the like (step S18). Then, the common electrode 32 is formed on the third inter-layer insulating film 112 (step S19). Thus, the flow illustrated in FIG. 30 ends.

(Alignment Direction of Liquid Crystal 31)

Figure 31:
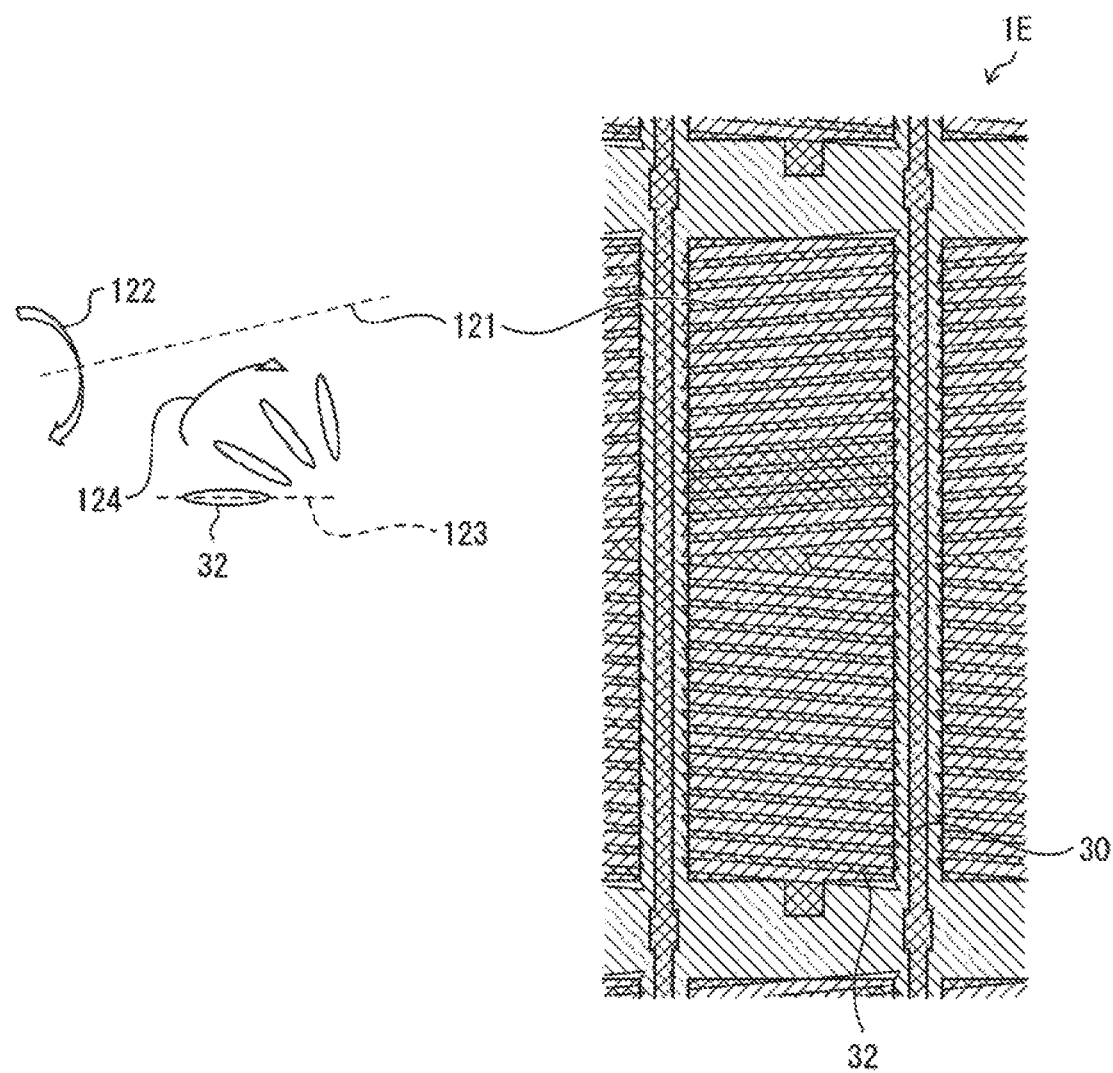
FIG. 31 is a view for explaining alignment of liquid crystal in a case where a voltage is applied to the pixel electrode.

FIG. 31 is a view for explaining alignment of the liquid crystal 31 in a case where a voltage is applied to the pixel electrode 30. When a voltage is applied to the liquid crystal 31, an electric field between the pixel electrode 30 and the common electrode 32 is generated in an electric field direction 122 that intersects with an extending direction 121 of the slit 111. The liquid crystal 31 that is aligned along an initial alignment axis 123 moves as if to rotate along a rotation direction 124 on the basis of intensity of the generated electric field. Alignment of the liquid crystal 31 is thereby controlled, and gradation display in the liquid crystal panel 1E is realized.

In the liquid crystal panel 1E that operates in the FFS mode, similarly to Embodiment 1 and the like, the contact hole 45 is formed in the intersection portion of the gate line 22 and the lower-layer source line 26. Thereby, a loss portion is able to be shared, thus making it possible to improve light transmittance of the pixel electrode 30.

In the liquid crystal panel 1E, auxiliary capacitance is able to be formed between the pixel electrode 30 and the common electrode 32 that face each other with the third inter-layer insulating film 112 held therebetween. Accordingly, the liquid crystal panel 1E may not include the auxiliary capacitance line 23. An alignment state of the liquid crystal 31 is different between an upper half region and a lower half region of the pixel 15 also in the liquid crystal panel 1E that, does not include the auxiliary capacitance line 23. Thus, a boundary between the upper half region and the lower half region becomes a dark line region in many cases. Then, when the contact hole 45 is provided at a position in the lower-layer source line 26, which faces the dark line region, a loss portion is able to be shared, so that it is possible to suppress a decrease in the aperture ratio (light transmittance) of the pixel 15 similarly to Embodiment 1.

CONCLUSION

A liquid crystal panel (1) according to an aspect 1 of the invention includes: a first substrate (21); and a second substrate (35), in which liquid crystal (31) is held between the first substrate and the second substrate, the first substrate includes a plurality of first wires (22), a second wire (lower-layer source line 26) that intersects with the plurality of first wires, and a third wire (upper-layer source line 29) that is arranged in a layer different from a layer in which the second wire is arranged and that is arranged in parallel to the second wire, an aperture (gate line aperture 42) is formed in at least any of all intersection portions in which the plurality of first wires and the second wire intersect, and the second wire and the third wire are connected through a contact hole (45) that is formed in the aperture.

With the aforementioned configuration, a decrease in a yield due to a line defect is suppressed and a high pixel aperture ratio is obtained.

In the liquid crystal panel according to an aspect 2 of the invention, the contact hole is formed near a center of the aperture, in the aspect 1.

With the aforementioned configuration, a decrease in a pixel aperture ratio and a decrease in display quality are able to be prevented more effectively.

In the liquid crystal panel according to an aspect 3 of the invention, the plurality of first wires include a gate line (22), and the second wire and the third wire are respectively a first source line (lower-layer source line 26) and a second source line (upper-layer source line 29), in the aspect 1.

In the liquid crystal panel according to an aspect 4 of the invention, the plurality of first wires include an auxiliary capacitance line (23), and the second wire and the third wire are respectively a first source line (lower-layer source line 26) and a second source line (upper-layer source line 29), in the aspect 1.

In the liquid crystal panel according to an aspect 5 of the invention, the plurality of first wires include a gate line (22) and an auxiliary capacitance line (23) that is arranged in parallel to the gate line, the second wire and the third wire are respectively a first source line (lower-layer source line 26) and a second source line (upper-layer source line 29), and the aperture includes a gate line aperture (42) that is formed in an intersection portion of the gate line and the first source line and an auxiliary capacitance line aperture (43)

that is formed in an intersection portion of the auxiliary capacitance line and the first source line, in the aspect 1.

The liquid crystal panel according to an aspect 6 of the invention further includes a pixel electrode (30) that is formed in a same layer as the third wire, in any of the aspects 1 to 5.

In the liquid crystal panel according to an aspect 7 of the invention, the third wire includes a same material as the pixel electrode, in the aspect 6.

With the aforementioned configuration, it is possible to simplify a method of manufacturing a liquid crystal panel.

In the liquid crystal panel according to an aspect 8 of the invention, a light shielding film (black matrix 34) is arranged at a position of the second substrate, which faces the aperture, in any of the aspects 1 to 7.

In the liquid crystal panel according to an aspect 9 of the invention, a common electrode (32) is arranged on a side of the liquid crystal of the third wire via an insulating film (second inter-layer insulating film 28), in any of the aspects 1 to 8.

In the liquid crystal panel according to an aspect 10 of the invention, the common electrode is arranged at a position that faces the aperture, in the aspect 9.

In the liquid crystal panel according to an aspect 11 of the invention, the common electrode includes a slit (91) that faces the pixel electrode, in the aspect 9 or 10.

A liquid crystal display device according to an aspect 12 of the invention includes the liquid crystal panel according to any of the aspects 1 to 11.

With the aforementioned configuration, it is possible to achieve a liquid crystal display device for which a decrease in a yield due to a line defect is suppressed and a high pixel aperture ratio is obtained.

The invention is not limited to each of the embodiments described above, and may be modified in various manners within the scope indicated in the claims. An embodiment achieved by appropriately combining technical means disclosed in each of different embodiments is also encompassed in the technical scope of the invention. By combining the technical means disclosed in each of the embodiments, a new technical feature may be formed.

REFERENCE SIGNS LIST 1, 1B, 1C, 1D, 1E liquid crystal panel, 11 gate driver, 12 source driver, 13 display region, 14 intersection portion, 15 pixel, 21 array substrate, 22 gate line, 23 auxiliary capacitance line, 24 first inter-layer insulating film, 25 TFT, 26 lower-layer source line, 27 drain electrode, 28 second inter-layer insulating film, 29 upper-layer source line, 30 pixel electrode, 31 liquid crystal, 32 common electrode, 33 color filter, 34 black matrix, 35 counter substrate, 41 pixel aperture, 42 gate line aperture, 43 auxiliary capacitance line aperture, 44 pixel portion contact hole, 45 contact hole, 51 disconnection, 52 current path, 53 pinhole, 54 short-circuit, 62 object to be removed, 63 connection portion, 64 alignment unstable region, 71 region, 81, 95, 103 direction, 85 cross region, 86 pixel invalid region, 91, 101, 111 slit, 92, 102 alignment control body, 94 dark line, 112 third inter-layer insulating film, 113 flattening film, 121 extending direction, 122 electric field direction, 123 initial alignment axis, 124 rotation direction

The invention claimed is:

1. A liquid crystal panel comprising:
a first substrate; and
a second substrate, wherein
liquid crystal is held between the first substrate and the second substrate,
the first substrate includes
a plurality of first wires,
a second wire that intersects with the plurality of first wires, and
a third wire that is arranged in a layer different from a layer in which the second wire is arranged and that is arranged in parallel to the second wire,
an aperture is formed in at least any of all intersection portions in which the plurality of first wires and the second wire intersect,
the second wire and the third wire are connected through a contact hole that is formed in the aperture,
the plurality of first wires includes a gate line and an auxiliary capacitance line that is arranged in parallel to the gate line,
the second wire and the third wire are respectively a first source line and a second source line, and
the aperture includes a gate line aperture that is formed in an intersection portion of the gate line and the first source line and an auxiliary capacitance line aperture that is formed in an intersection portion of the auxiliary capacitance line and the first source line.

2. The liquid crystal panel according to claim 1, wherein the contact hole is formed near a center of the aperture.

3. The liquid crystal panel according to claim 1, further comprising a pixel electrode that is formed in a same layer as the third wire.

4. The liquid crystal panel according to claim 3, wherein the third wire includes a same material as the pixel electrode.

5. The liquid crystal panel according to claim 1, wherein a light shielding film is arranged at a position of the second substrate, which faces the aperture.

6. The liquid crystal panel according to claim 1, wherein a common electrode is arranged on a side of the liquid crystal of the third wire via an insulating film.

7. The liquid crystal panel according to claim 6, wherein the common electrode is arranged at a position that faces the aperture.

8. The liquid crystal panel according to claim 6, wherein the common electrode includes a slit that faces the pixel electrode.

9. A liquid crystal display device comprising the liquid crystal panel according to claim 1.

* * * * *